(12) United States Patent
Seki

(10) Patent No.: US 6,852,024 B2
(45) Date of Patent: Feb. 8, 2005

(54) AIR PASSAGE SWITCHING DEVICE AND VEHICLE AIR CONDITIONER USING THE SAME

(75) Inventor: Hideki Seki, Toyoake (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/763,108

(22) Filed: Jan. 22, 2004

(65) Prior Publication Data

US 2004/0152410 A1 Aug. 5, 2004

(30) Foreign Application Priority Data

Jan. 23, 2003 (JP) ........................................ 2003-014463

(51) Int. Cl.[7] ................................................ B69H 1/00
(52) U.S. Cl. .......................................... 454/121; 165/43
(58) Field of Search .......................... 454/121; 165/204, 165/42, 43

(56) References Cited

U.S. PATENT DOCUMENTS

| | | | |
|---|---|---|---|
| 5,699,851 A | * | 12/1997 | Saida et al. .................... 165/42 |
| 5,701,949 A | | 12/1997 | Nobuyuki et al. |
| 5,899,806 A | | 5/1999 | Tomoki et al. |
| 6,032,723 A | * | 3/2000 | Tsuihiji et al. ................. 165/42 |
| 6,685,554 B2 | * | 2/2004 | Abouchaar ................... 454/121 |
| 2004/0093884 A1 | * | 5/2004 | Seki et al. ..................... 62/244 |

* cited by examiner

Primary Examiner—Harold Joyce
(74) Attorney, Agent, or Firm—Harness, Dickey & Pierce, PLC

(57) ABSTRACT

In an air-outlet switching device of a vehicle air conditioner, a first rotary door is disposed to open and close a foot opening portion and a communication path, and a second rotary door is disposed to open and close a defroster opening portion and a face opening portion that are provided downstream of the communication path. When the first rotary door is operated at an intermediate position to open both of the foot opening portion and the communication path, an air distributing guide member of the second rotary door is positioned opposite to an outer peripheral door surface of the rotary door, to be separated from the outer peripheral door surface by a predetermined distance to a radial outside. Accordingly, it can prevent a variation of an air amount blown from the defroster opening portion due to a variation of the intermediate operated position of the first rotary door.

15 Claims, 15 Drawing Sheets

AIR PASSAGE SWITCHING DEVICE AND VEHICLE AIR CONDITIONER USING THE SAME

CROSS REFERENCE TO RELATED APPLICATION

This application is based on Japanese Patent Application No. 2003-14463 filed on Jan. 23, 2003, the disclosure of which is incorporated herein by reference.

FIELD OF THE INVENTION

The present invention relates to an air passage switching device for opening and closing an air passage. The air passage switching device is suitably used as an air-outlet mode selecting device of a vehicle air conditioner, including first and second doors for opening and closing air outlet opening portions.

BACKGROUND OF THE INVENTION

In an air-outlet mode selecting mechanism, air outlet opening portions such as a face opening portion, a defroster opening portion and a foot opening portion are opened and closed by the use of a single rotary door having an outer peripheral door surface turning with a rotary shaft. Further, the outer peripheral door surface turning with the rotary shaft is arranged at a position separated by a predetermined distance outward in a radial direction from the center of the rotary shaft. However, in this case, all of the face opening portion, the defroster opening portion and the foot opening portion of an air conditioning unit need to be arranged in an arc shape along the turning path of the outer peripheral door surface of the rotary door. Generally, the air conditioning unit is arranged in a place that is inside the instrument board (i.e., dashboard) of the vehicle and is subjected to extreme spatial constraint. Thus, it is difficult to perform an arrangement of the face opening portion, the defroster opening portion and the foot opening portion in the shape of an arc. Further, in order to ensure the respective air volumes blown off from the three air outlet opening portions, the areas of the respective air outlet opening portions need to be enlarged and hence the area of the outer peripheral door surface of the rotary door needs to be enlarged. As a result, the rotary door is increased in size, and the mounting performance of the air conditioning unit in the vehicle is further deteriorated.

To overcome the problems, Japanese Patent Application No. 2002-321267 proposes an air-outlet mode switching device including two rotary doors. Further, in a foot mode, one of the rotary doors is rotated at an intermediate opening-degree position for introducing conditioned air into the defroster opening portion. However, according to experiments by the inventor of the present application, an air amount blown from the defroster opening portion in the foot mode may be greatly changed due to a change of the intermediate opening-degree position of the one rotary door.

SUMMARY OF THE INVENTION

In view of the above-described problems, it is an object of the present invention to provide an air passage switching device having a first door and a second door disposed downstream of the first door, which can prevent a variation of an air amount blown from an air-outlet opening portion opened by the second door, due to a variation of an intermediate opening position of the first door.

It is another object of the present invention to provide a vehicle air conditioner in which the air passage switching device is suitably used as an air-outlet selecting device.

According to an aspect of the present invention, an air passage switching device includes a case having a first opening portion and a plurality of second opening portions through which air in an air passage of the case flows to an outside of the case, a first door disposed in the case for opening and closing the first opening portion and a communication path that is provided within the case upstream of the second opening portions, a second door disposed downstream of the first door and the communication path, for opening and closing the second opening portions, and an air distributing guide member provided in the second door to be moved integrally with the second door. The first door is a rotary door including a rotation shaft, an outer peripheral door surface separated from a center axial line of the rotation shaft to a radial outside by a predetermined distance, and two side plates connected to the rotation shaft and end portions of the outer peripheral surface in an axial direction of the rotation shaft. The second door is operatively linked with the first door. Further, the rotary door constructing the first door is disposed to be rotatable between a first position where the first opening portion is closed by the rotary door, and a second position where the communication path is closed by the outer peripheral door surface of the rotary door. In the air passage switching device, when the rotary door is moved to a predetermined position between the first position and the second position, both of the first opening portion and the communication path are opened, and the second door opens at least one of the second opening portions. Further, when the rotary door is moved to the predetermined position, the air distributing guide member is positioned on the second door, opposite to the outer peripheral door surface of the rotary door, to be separated from the outer peripheral door surface by a predetermined distance (L1) to a radial outside. Therefore, an air amount blown from one of the second opening portions is regulated by an air passage defined between the outer peripheral door surface of the rotary door and the air distributing guide member. Thus, a variation of the air amount blown from the one of the second opening portions, due to a variation of the predetermined position of the rotary door between the first position and the second position, can be effectively reduced.

For example, the air distributing guide member has a flat surface, or a circular arc shape along a rotation locus of the outer peripheral door surface. Further, the second door can be constructed of a rotary door. In this case, the air distributing guide member is a beam member that extends in the axial direction to be connected to the two side plates. Alternatively, the second door is a plate door having a rotation shaft and a plate member rotatable around the rotation shaft.

Preferably, the second opening portions include a door side opening portion arranged at a side close to the rotary door, and an anti-door side opening portion arranged at a side far away from the rotary door than the door side opening portion. In this case, when the rotary door is moved to the predetermined position, the second door closes the door side opening portion and opens the anti-door side opening portion, and the air distributing guide member is positioned opposite to the outer peripheral door surface of the rotary door to be separated from the outer peripheral door surface by the predetermined distance. Further, when the second door is moved to a position where the door side opening portion is opened and the anti-door side opening portion is closed, the air distributing guide member is moved at a position offset from an air flow toward the door side opening portion. Thus, it can prevent the air amount blown from the door side opening portion from being reduced due to the air distributing guide member.

The air passage switching device can be suitable used as an air-outlet mode selecting device of a vehicle air conditioner. For example, the first opening portion is a foot opening portion for blowing air toward a lower side in the passenger compartment, and the second opening portions include a defroster opening portion for blowing air toward an inner surface of a front windshield of the vehicle and a face opening portion for blowing air toward an upper side in the passenger compartment. In this case, when the rotary door is moved to the predetermined position for opening the foot opening portion and opening the communication path by a predetermined opening degree, the second door closes the face opening portion and opens the defroster opening portion. Thus, when a foot mode is set as an air outlet mode, for example, a variation of an air amount blown from the defroster opening portion, due to a variation of the predetermined position of the rotary door between the first position and the second position, can be effectively reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

The first embodiment of the present invention will be now described with reference to FIGS. 1–13. In the first embodiment, an air passage switching device of the present invention is typically used for an air-outlet mode selecting device of a vehicle air conditioner.

Figure 1:
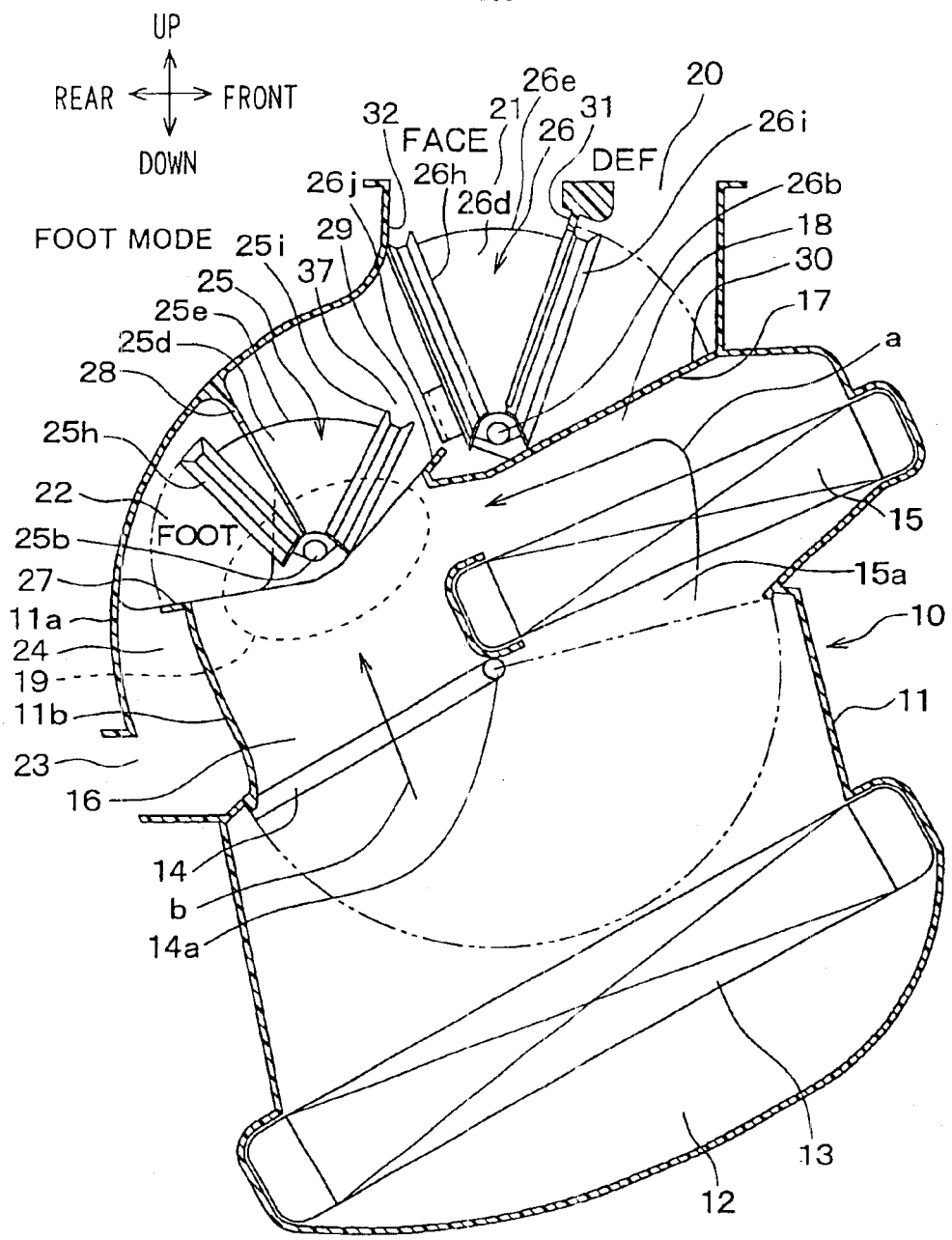
FIG. 1 is a longitudinal cross-sectional view of an air conditioning unit in a foot mode, in accordance with a first embodiment of the present invention.

FIG. 1 shows an air conditioning unit 10 having a heat exchanging portion in an interior unit section in a vehicle air conditioner according to a first embodiment of the present invention. This air conditioning unit 10 is approximately arranged in a central portion of the vehicle in its left-right (width) direction on the inside of a dashboard (instrument board) of the front portion within a passenger compartment. Upper and lower and front and rear arrows of FIG. 1 show directions of the air conditioning unit 10 in a vehicle mounting state. The interior unit section of the vehicle air conditioner is generally divided into the air conditioning unit 10 arranged in the approximately central portion, and an unillustrated blower unit offset and arranged on the assistant driver's seat side inside the instrument board.

The blower unit has an inside-outside air switching box for switching and introducing outside air (i.e., air outside the passenger compartment) or inside air (i.e., air inside the passenger compartment), and a centrifugal type blower for blowing the air introduced into this inside-outside air switching box. The blowing air of this blower unit flows into an air inflow space 12 of a lowermost portion within a case 11 of the air conditioning unit 10.

The case 11 is molded by resin having an elasticity as in polypropylene and having a high mechanical strength. The case 11 is constructed to be divided into plural divisional cases and is molded, for readily performing a die extraction in a molding. After air conditioning equipments of the air conditioner are assembled into the case, the plural divisional cases are then integrally fastened.

An evaporator 13 constituting a cooling heat exchanger is arranged approximately in the horizontal direction above the air inflow space 12 within the case 11 of the air conditioning unit 10 at a small inclination angle. Accordingly, the blowing air of the blower unit flows into the air inflow space 12, and then passes through the evaporator 13 upwardly from this space 12 from below. As being well known, the evaporator 13 is constructed such that a low pressure refrigerant reduced in pressure by a pressure reduction device such as an expansion valve, etc. of a refrigerant cycle flows into the evaporator 13, and absorbs heat from the blowing air and is evaporated.

An air mix door 14 and a hot water type heat core 15 constituting a heating heat exchanger are arranged above the evaporator 13 on a downstream side of the evaporator 13 in an air flow direction. Here, the air mix door 14 is constructed of a cantilever plate door rotated with a rotating shaft 14a as a center.

As being well known, the heater core 15 heats air by using hot water (engine cooling water) of the vehicle engine as a heat source. This heater core 15 is also approximately arranged in the horizontal direction. Generally, the heater core 15 is approximately arranged in parallel with the evaporator 13. However, the heater core 15 is set to be smaller than a passage sectional area within the case 11 and is arranged so as to be shifted on the front side of the vehicle within the case 11. Thus, a cool air passage 16 through which the air (cool air) flows while bypassing the heater core 15 is formed on a vehicle rear side (i.e., a part near a front seat) of the heater core 15.

The air mix door 14 is rotated in the front and rear direction of the vehicle between the evaporator 13 and the heater core 15 so that an inlet ventilation path 15a of the heater core 15 and the cool air passage 16 are opened and closed by the air mix door 14. Thus, an air flow ratio of the warm air (arrow "a") heated by passing the inlet ventilation path 15a of the heater core 15 and the cool air (arrow "b") passing the cool air passage 16 is adjusted, and the blowing-out air temperature into the passenger compartment can be adjusted. Accordingly, a temperature adjusting means of the blowing-out air into the passenger compartment is constructed by the air mix door 14.

The rotating shaft 14a of the air mix door 14 is rotatably supported by unillustrated bearing holes of left and right side wall portions of the case 11, and one end portion of the rotating shaft 14a is projected outside the case 11 and is connected to an air mix door operating mechanism. An actuator mechanism using a motor is normally used as this air mix door operating mechanism, but a manual operating mechanism may be also used instead of the actuator mechanism.

A warm air guide wall 17 is molded integrally with the case 11 above the heater core 15 so as to be separated by a predetermined distance from this heater core 15. A warm air passage 18 is formed between this warm air guide wall 17 and the upper face portion (air outlet portion) of the heater core 15. The warm air after passing through the heater core 15 is guided by the warm air guide wall 17 and flows toward a vehicle rear side in the warm air passage 18 as shown by the arrow "a".

An air mixing portion 19 is formed in the upper portion of the cool air passage 16, and mixes the warm air flowing in this warm air passage 18 toward the vehicle rear side and the cool air raised in the cool air passage 16 as shown by the arrow "b".

A defroster opening portion 20 is opened to a vehicle front side part in the upper face portion of the case 11. A face opening portion 21 is opened to a vehicle rear side part of the defroster opening portion 20 in the upper face portion of the case 11. Both the defroster opening portion 20 and the face opening portion 21 have a rectangular shape, and more concretely has a rectangular shape having long sides in the vehicle left and right direction and short sides in the vehicle front and rear direction.

The defroster opening portion 20 is arranged to blow-out the conditioned air from the air mixing portion 19 toward an inner surface of a front windshield of the vehicle. The face opening portion 21 is arranged to blow-out the conditioned air from the air mixing portion 19 toward the upper half portion of the body of a passenger in the passenger compartment.

A front-seat side foot opening portion 22 is opened to a part located slightly above the air mixing portion 19 in each of the side wall portions of both the vehicle left and right sides of the case 11 and adjacent to a vehicle rear side wall face 11a of the case 11. The front-seat side foot opening portions 22 on both the left and right sides are arranged to blow-out the conditioned air from the air mixing portion 18 toward the foot portion of a front seat side passenger (a driver and an assistant front seat passenger). The front-seat side foot opening portion 22 has a shape in which the opening width of a bottom side portion is maximum and this foot opening portion 22 is thinly sharpened approximately in a triangular shape toward the upper portion.

A rear-seat side foot opening portion 23 is arranged on the vehicle rear side wall face 11a of the case 11 on a downward side from the front-seat side foot opening portion 22. This rear-seat side foot opening portion 23 and the front-seat side foot opening portion 22 are communicated with each other by a rear-seat side foot passage 24 at all times. This rear-seat side foot passage 24 is formed between the vehicle rear side wall face 11a of the case 11 and a cool air passage wall face 11b located inside (vehicle front side) this wall face 11a.

In this embodiment, an air-outlet mode switching mechanism is constructed by first and second rotary doors 25, 26. The front-seat side foot opening portion 22 is opened and closed by the first rotary door 25. The defroster opening portion 20 and the face opening portion 21 are opened and closed by the second rotary door 26. A communication path 37 is formed adjacently to the vehicle front side of the front-seat side foot opening portion 22. The defroster opening portion 20 and the face opening portion 21 are communicated with the air mixing portion 19 through this communication path 37. The communication path 37 is opened and closed by the first rotary door 25 while the front-seat side foot opening portion 22 is opened and closed by the first rotary door 25. That is, the first rotary door 25 is disposed to open and close both the front-seat side foot opening portion 22 and the communication path 37.

Figure 2:
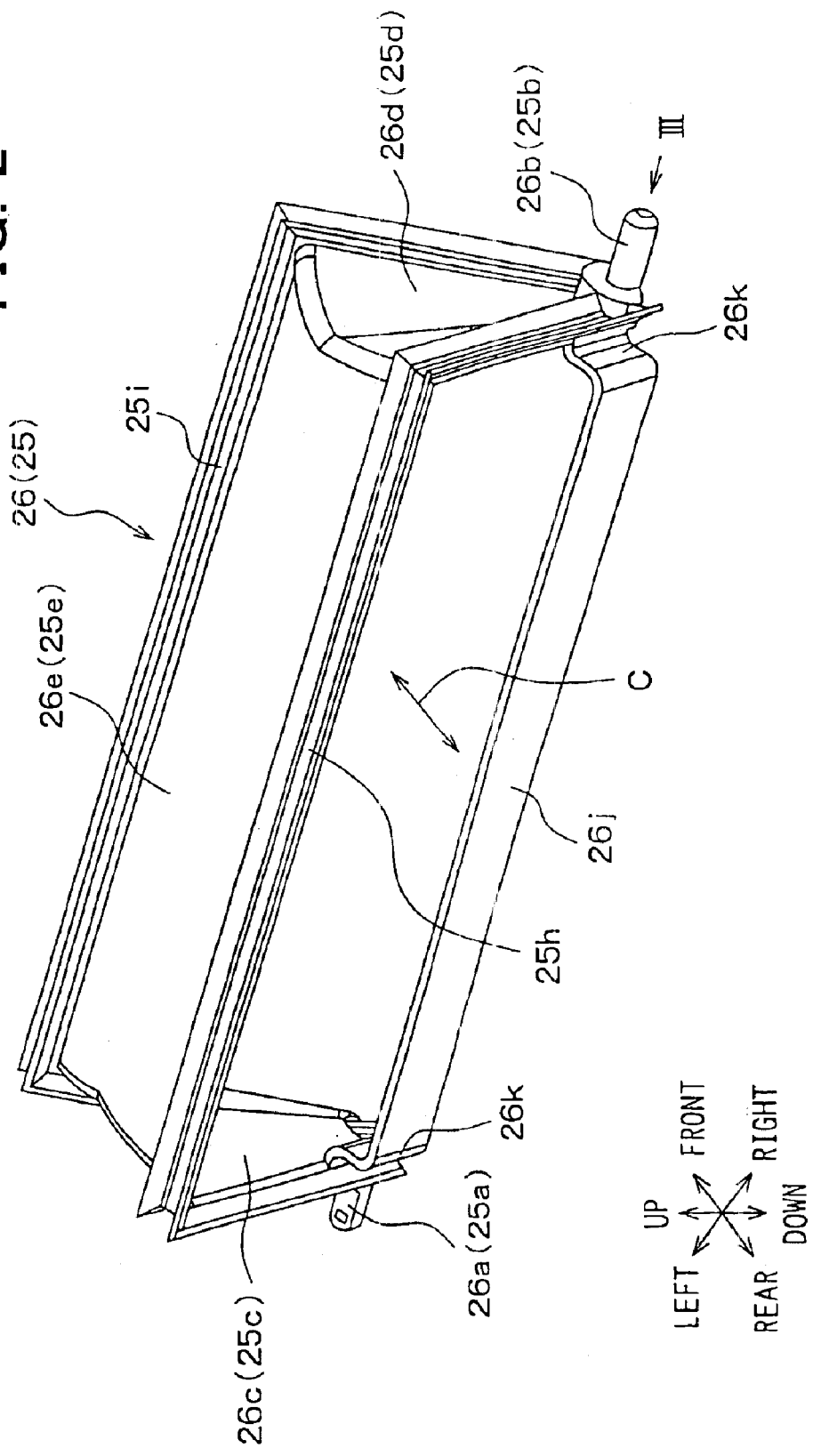
FIG. 2 is a perspective view showing a rotary door structure in the first embodiment.
Figure 3:
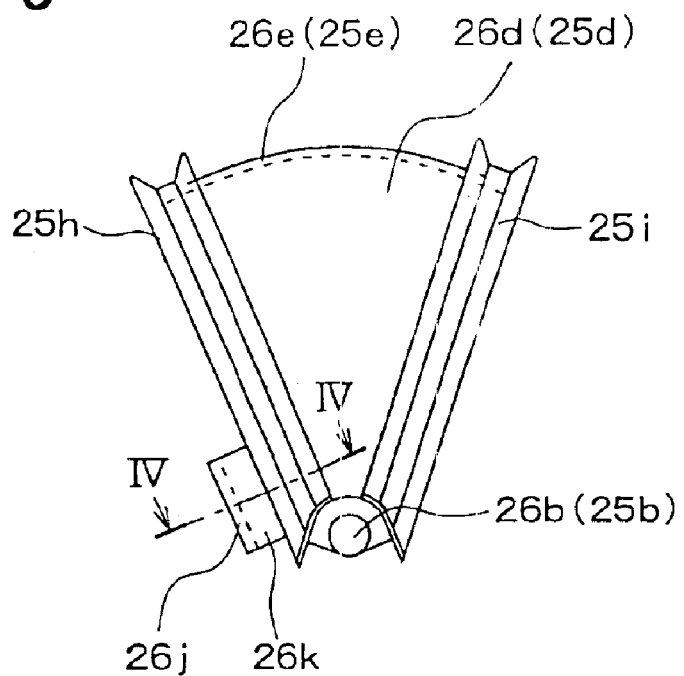
FIG. 3 is a side view when being viewed from the arrow III in FIG. 2.
Figure 4:
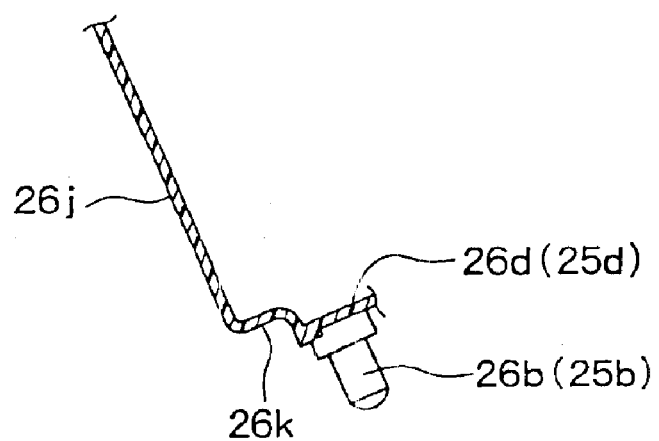
FIG. 4 is a cross-sectional view taken along the line IV—IV in FIG. 3.

The first and second rotary doors 25, 26 have different outside shape sizes, etc., but basically have the same door construction. FIGS. 2 to 4 show the second rotary door 26. In FIGS. 2 to 4, only an air distributing guide member 26j is an element peculiar to the second rotary door 26. The other elements except for this air distributing guide member 26j are the same with respect to the first and second rotary doors 25, 26. Accordingly, in FIGS. 2 to 4, the reference numerals of elements of the first rotary door 25 are shown by parentheses.

A rotary door construction will next be described by FIGS. 2 to 4 with the first rotary door 25 as an example. In the first rotary door 25, left and right rotary shafts 25a, 25b, left and right fan-shaped side plate portions 25c, 25d and an outer circumferential door face 25e are integrally constructed.

The left and right rotary shafts 25a, 25b are formed so as to be projected to the left and right outsides in the pivot position of the fan shape of the left and right side plate portions 25c, 25d, and are rotatably supported by unillustrated bearing holes of side wall portions on both the left and right sides of the case 11. The outer circumferential door face 25e is connected to the outer circumferential end portions of the left and right fan-shaped side plate portions 25c, 25d so that the left and right fan-shaped side plate portions 25c, 25d and the outer circumferential door face 25e construct a gate shape (U-shape). The inside space of this gate shape is opened to the space within the case 11 as it is at all times. Accordingly, air can be freely circulated in the inside space of the gate shape in the direction of an arrow "c" (direction perpendicular to the rotary shaft direction).

In the example illustrated in FIG. 2, the strengths of the side plate portions 25c, 25d are improved by respectively forming the left and right fan-shaped side plate portions 25c, 25d in shapes curved by slight amounts on the inside in the rotary shaft direction. Further, the outer circumferential door face 25e is located in a part separated by a predetermined amount in the radial direction (radial outward side) of the rotary shafts 25a, 25b from the centers of the rotary shafts 25a, 25b, and is extended in the door rotating direction (circumferential direction) and forms a predetermined wall area.

More concretely, the outer circumferential door face 25e of this embodiment is formed in an arc sectional shape with the rotary shafts 25a, 25b as centers. The planar shape of the outer circumferential door face 25e is approximately set to a rectangular shape having long sides in the left and right direction of the vehicle and short sides in the front and rear direction of the vehicle. Both axial end portions of the outer circumferential door face 25e are connected to the rotary shaft 25a by the left and right side plate portions 25c, 25d.

The first rotary door 25 is integrally molded by resin having a high mechanical strength such as polypropylene and having an elasticity to a certain degree in the entire shape including the above rotary shafts 25a, 25b, the fan-shaped side plate portions 25c, 25d and the outer circumferential door face 25e. In contrast to this, the second rotary door 26 is integrally molded by resin in the entire shape including the air distributing guide member 26j in addition to rotary shafts 26a, 26b, fan-shaped side plate portions 26c, 26d and an outer circumferential door face 26e. The air distributing guide member 26j will be described later in detail.

A seal structure in the first rotary door 25 will next be described. The door seal structure is set to a lip seal type to reduce door operating force, and is integrally molded so as to project flange-shaped portions 25f, 25g (see FIG. 5 described later) onto the outward side on the surfaces of peripheral edge portions of the outer circumferential door face 25e and the side plate portions 25c, 25d. The outer circumferential door face 25e and the side plate portions 25c, 25d constitute a door base plate portion in the door 25. Seal portions 25h, 25i are fixedly attached onto the flange portions 25f, 25g.

One seal portion 25h is located on one end side (vehicle rear side) in the door rotating direction in the door base plate portion. The other seal portion 25i is located on the other end side (vehicle front side) of the door base plate portion in the door rotating direction. Accordingly, both the seal portions 25h, 25i are formed so as to be widened in a V-shape from the pivot parts (arranging parts of the rotary shafts 25a, 25b) of the fan shapes of the side plate portions 25c, 25d as shown in FIGS. 1 to 3.

Both the seal portions 25h, 25i are constructed by an elastic body and are projected outward on the front side from the flange portions 25f, 25g in a lip shape (thin plate shape). Here, both the seal portions 25h, 25i are respectively and approximately projected outward in a V-shaped cross section from the surfaces of the flange portions 25f, 25g. As shown in FIG. 2, the entire shape of both the seal portions 25h, 25i constitutes a gate shape (U-shape) similar to the entire shape of the rotary door 25 when the entire shape of both the seal portions 25h, 25i is seen from the direction "c" of an air flow inside the rotary door 25.

A material of both the seal portions 25h, 25i can be set so that both the seal portions 25h, 25i can be molded as in thermoplastic resin at high temperature. In contrast to this, both the seal portions 25h, 25i can be fixedly attached onto the flange portions 25f, 25g by the integral molding at the molding time of the door base plate portions (portions 25e, 25c, 25d) of the first rotary door 25 by using thermoplastic elastomer having a rubber elasticity at the normal temperature.

In the case 11, seal faces 27, 28 are integrally formed in both front and rear side parts (both front and rear side parts of the first rotary door 25 in its rotating direction) of the front-seat side foot opening portion 22.

Further, a seal face 29 is formed in the case 11 and is located on the further front side of the vehicle from the vehicle front side seal face 28 of the front-seat side foot opening portion 22. More concretely, a folded-bent portion folded and bent upward is formed in a vehicle rear side end portion of the warm air guide wall 17 and the seal face 29 is formed by the upper face portion of this folded-bent portion.

The seal face 27 constitutes a rear side seal face located on the rear side in the vehicle front and rear direction (door rotating direction) by the above arrangement. The seal face 28 constitutes an intermediate seal face located in an intermediate portion in the vehicle front and rear direction (door rotating direction). The seal face 29 constitutes a front side seal face located on the front side in the vehicle front and rear direction (door rotating direction).

Each of the three seal faces 27, 28, 29 is formed in a gate shape corresponding to the entire gate shape of both the seal portions 25h, 25i. The entire gate shape of the seal portions 25h, 25i is elastically deformed so that the seal portions 25h, 25i of the rotary door 25 are respectively press-attached to the three seal faces 27, 28, 29. For example, when one of the seal portions 25h, 25i of the rotary door 25 press-contacts a corresponding one of the seal faces 27, 28, 29 of the case 11, an air-leakage therebetween can be prevented.

Figure 8:
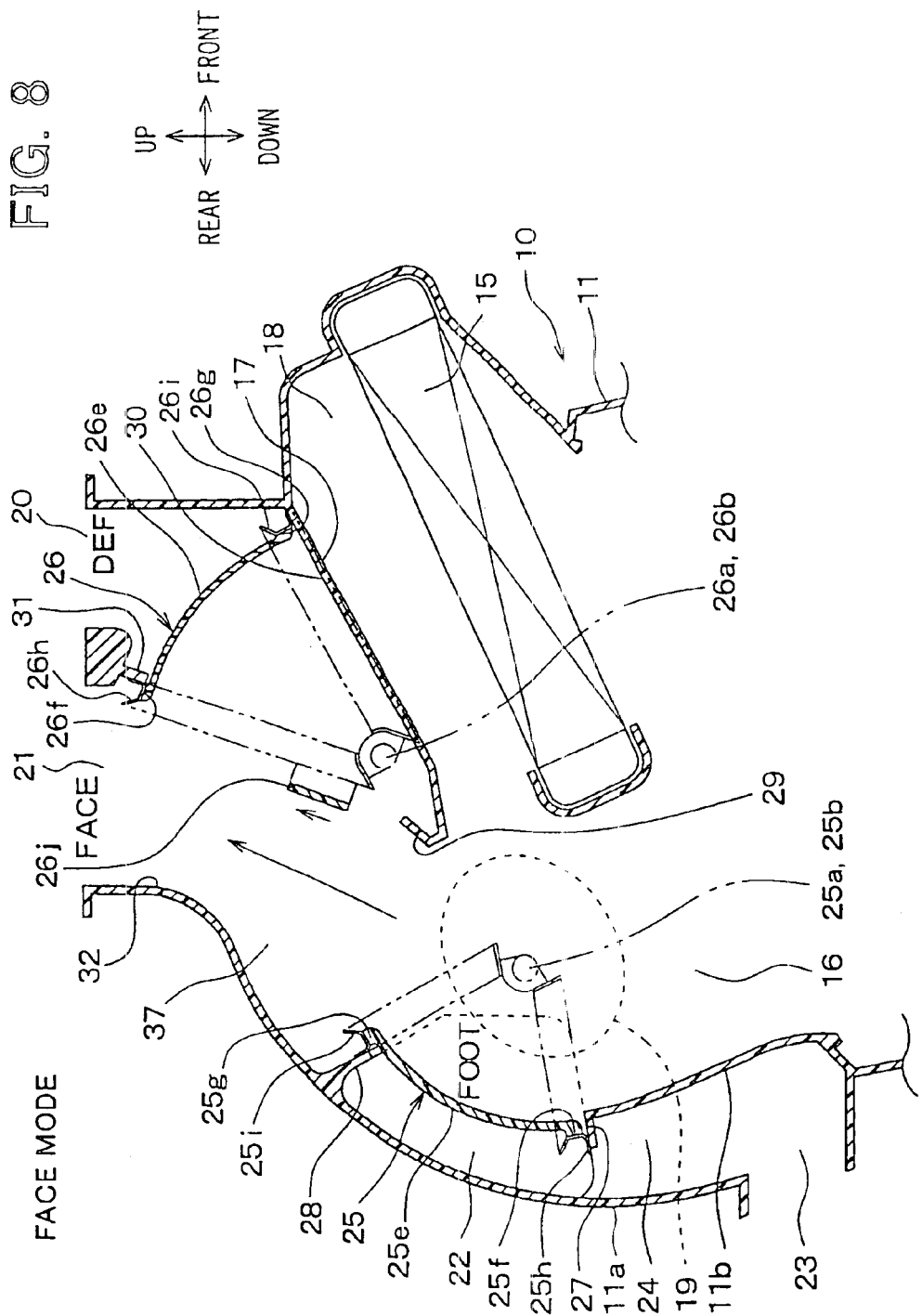
FIG. 8 is a cross-sectional view showing a main part of the air conditioning unit of FIG. 1, in a face mode.

As shown in FIG. 8, a lip portion of the rear side (outward side) among the lip portions approximately formed in a V-shape and constituting the rear side seal portion 25h of the first rotary door 25 is press-attached to the rear side seal face 27 among the above seal faces 27, 28, 29.

The intermediate seal face 28 constitutes seal faces on both the front and rear sides in the vehicle front and rear direction. As shown in FIG. 8, a lip portion of the rear side (door inward side) among the lip portions approximately formed in a V-shape and constituting the front side seal portion 25i of the first rotary door 25 is press-attached to the front face of this intermediate seal face 28.

Figure 5:
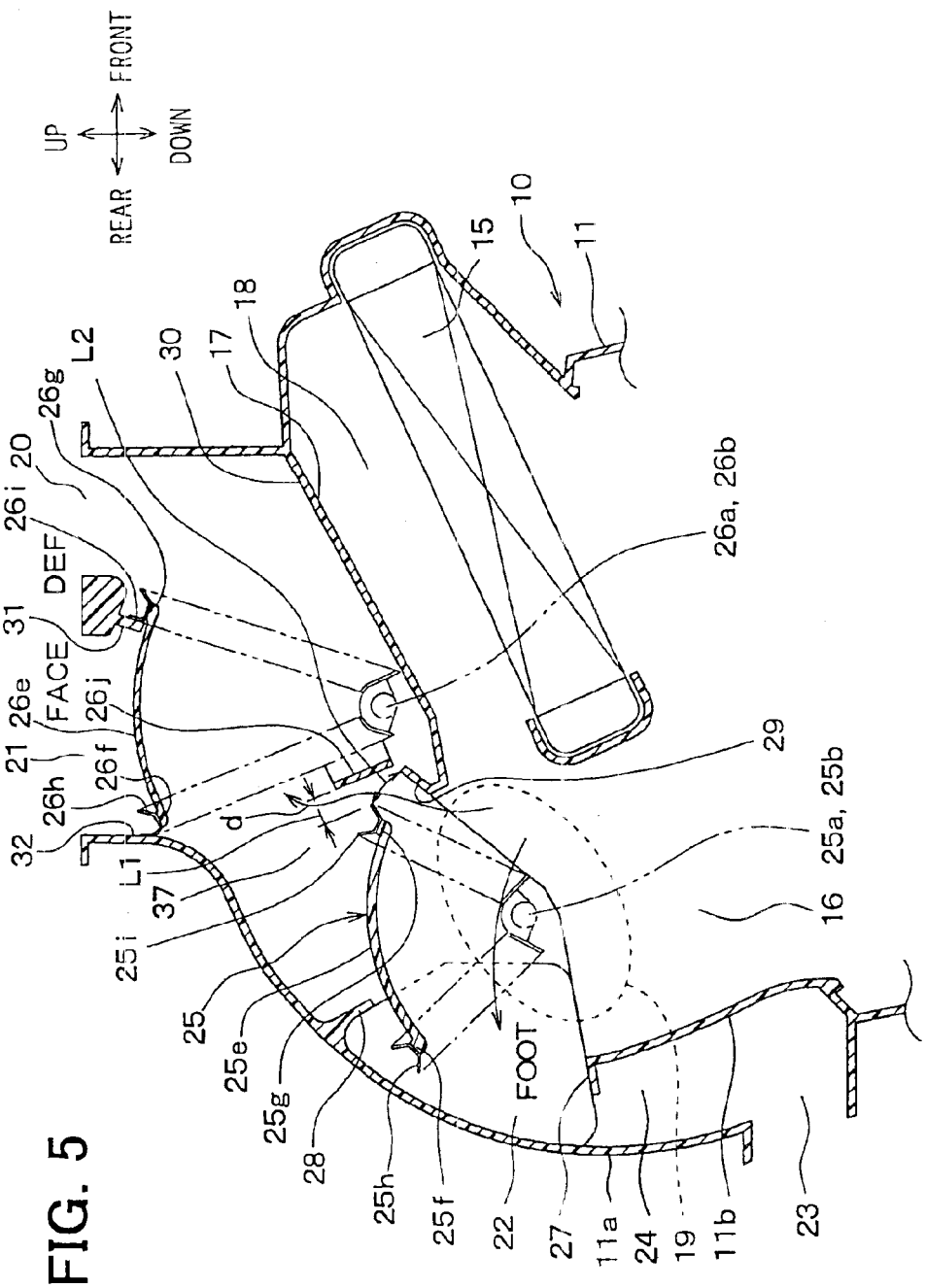
FIG. 5 is a cross-sectional view showing a main part of the air conditioning unit of FIG. 1, in the foot mode.

In this embodiment, the communication path 37 is set to be also opened at a very small opening degree (a small aperture) as shown in FIGS. 1 and 5 in a foot mode. Accordingly, in this case, no air outlet mode for completely opening the front-seat side foot opening portion 22 and completely closing the communication path 37 is set. When the air outlet mode for completely opening the front-seat side foot opening portion 22 and completely closing the communication path 37 is set, the lip portion of the front side (door inward side) among the lip portions approximately formed in the V-shape and constituting the rear side seal portion 25h of the first rotary door 25 is press-attached to the rear face of the intermediate seal face 28. Further, the lip portion of the front side (door outward side) among the lip portions approximately formed in the V-shape and constituting the front side seal portion 25i of the first rotary door 25 is press-attached to the front side seal face 29.

The second rotary door 26 is integrally molded by resin in the entire shape including the air distributing guide member 26j described later in addition to the rotary shafts 26a, 26b, the fan-shaped side plate portions 26c, 26d and the outer circumferential door face 26e. Seal portions 26h, 26i of the second rotary door 26 are the same as the seal portions 25h, 25i of the first rotary door 25.

In contrast to this, in the case 11, seal faces 30, 31, 32 are respectively and integrally formed in a front side part in the vehicle front and rear direction (door rotating direction) in the defroster opening portion 20, an intermediate part of the defroster opening portion 20 and the face opening portion 21, and a rear side part in the vehicle front and rear direction (door rotating direction) of the face opening portion 21. The seal portions 26h, 26i of the second rotary door 26 are elastically deformed and are press-attached to the three seal faces 30, 31, 32.

The seal faces 31, 32 among the three seal faces 30, 31, 32 are formed in a gate shape corresponding to the entire gate shape of both the seal portions 26*h*, 26*i*. The entire gate shapes of the seal portions 26*h*, 26*i* are respectively press-attached to the seal faces 31, 32 of the case 11.

The remaining seal face 30 has a simple planar shape because this seal face 30 is formed in the upper face portion of the warm air guide wall 17 located on the downward side of the defroster opening portion 20. The entire gate shape of the seal portion 26*i* is also press-attached to this seal face 30. More concretely, the lip portion of the front side (outward side) among the lip portions approximately formed in the V-shape and constituting the front side seal portion 26*i* of the second rotary door 26 is press-attached to the seal face 30 as shown in FIG. 8.

The intermediate seal face 31 located in the intermediate part of the defroster opening portion 20 and the face opening portion 21 constitutes the seal faces on both the sides in the vehicle front and rear direction. The lip portion of the front side (door inward side) among the lip portions approximately formed in the V-shape and constituting the rear side seal portion 26*h* of the second rotary door 26 is press-attached to the rear face of this intermediate seal face 31 as shown in FIG. 8.

When the face opening portion 21 is completely closed (see FIGS. 1 and 5, etc. described later), the lip portion of the rear side (door inward side) among the lip portions approximately formed in the V-shape and constituting the front side seal portion 26*i* of the second rotary door 26 is press-attached to the front face of the intermediate seal face 28.

When the face opening portion 21 is completely closed, the lip portion of the rear side (door outward side) among the lip portions approximately formed in the V-shape and constituting the rear side seal portion 26*h* of the second rotary door 26 is press-attached to the rear side seal face 32.

The first and second rotary doors 25, 26 constitute air-outlet mode doors for switching the air outlet mode, and are operatively linked to each other by an unillustrated common air-outlet mode door operating mechanism. Concretely, one of the rotary shafts 25*a*, 25*b* on both the left and right sides of the first rotary door 25, e.g., the left side rotary shaft 25*a*, and one of the rotary shafts 26*a*, 26*b* on both the left and right sides of the second rotary door 26, e.g., the left side rotary shaft 26*a* are projected to the exterior of left and right side wall portions of the case 11. These projecting portions of both the rotary shafts 25*a*, 26*a* are connected to the common air-outlet mode door operating mechanism through a link mechanism. An actuator mechanism using a motor is normally used as this air-outlet mode door operating mechanism, but a manual operating mechanism can be also used instead of the actuator mechanism.

The air distributing guide member 26*j* in the second rotary door 26 will next be described in detail. The air distributing guide member 26*j* is arranged on the end face at a side of the communication path 37 among the left and right fan-shaped side plate portions 26*c*, 26*d* constituting one of the door base plate portion of the second rotary door 26.

This air distributing guide member 26*j* is an elongated plate member extending in parallel with the axial direction of the rotary shafts 26*a*, 26*b*, as shown in FIG. 2. Bent portions 26*k* are disposed in both left and right end portions of this air distributing guide member 26*j*. Both the end portions of the air distributing guide member 26*j* are integrally connected to the end faces of the left and right side plate portions 26*c*, 26*d* through the bent portions 26*k* as shown in FIG. 4. The air distributing guide member 26*j* is projected outward onto the side of the first rotary door 25 by a predetermined amount from the end faces of the side plate portions 26*c*, 26*d* by means of the bent portions 26*k*.

The arranging place of the air distributing guide member 26*j* will be more concretely described. When the first and second rotary doors 25, 26 are operated to the foot mode positions shown in FIGS. 1 and 5, the plane surface of the air distributing guide member 26*j* is oppositely separated from a tip of the lip portion of the front side seal portion 25*i* of the first rotary door 25 by a predetermined distance L1 on the door radial outward side.

The plane surface of the air distributing guide member 26*j* is arranged in parallel with the end faces of the side plate portions 26*c*, 26*d* and is also arranged in a position near the seal face 29. Accordingly, an air flow to be directly introduced into the rotary shafts 26*a*, 26*b* in the inside space of the second rotary door 26 from the air mixing portion 19 is interrupted by the air distributing guide member 26*j*. Therefore, an air passage for introducing the conditioned air toward the defroster opening portion 20 upwardly as shown by an arrow "d" of FIG. 5 is formed by the predetermined distance L1 along the plane surface of the air distributing guide member 26*j*.

The predetermined distance L1 on the door radial outward side of the first rotary door 25 is set to be smaller than a predetermined distance L2 in the door circumferential direction between the tip of the seal portion 25*i* and the seal face 29. Accordingly, the air amount (arrow "d" of FIG. 5) flowing toward the defroster opening portion 20 while passing the communication path 37 in the foot mode is determined by the air passage having the predetermined distance L1.

The distance between the upper end face of the air distributing guide member 26*j* and the outer circumferential door face 26*e* is set so as to secure a ventilating area equal to or greater than that of the defroster opening portion 20.

The operation of the first embodiment in the above construction of the vehicle air conditioner will next be described. FIGS. 1 and 5 show the operation in the foot mode. Both the seal portions 25*h*, 25*i* of the first rotary door 25 are respectively operated to intermediate opening positions separated by a small angle from the case-side seal faces 28, 29 before and after the communication path 37 in the counterclockwise direction. Thus, the first rotary door 25 largely opens the inlet side flow paths of the front-seat side foot opening portions 22, 22 on both the left and right sides in a state close to the complete opening state.

In contrast to this, the second rotary door 26 is operated to a rotating position on the side of the face opening portion 21 (vehicle rear side) in association with the rotation displacement of the first rotary door 25 at this time. Both the seal portions 26*h*, 26*i* of the second rotary door 26 are respectively and elastically press-attached to the case-side seal faces 32, 31 before and after the face opening portion 21. Accordingly, the face opening portion 21 is completely closed and the defroster opening portion 20 is completely opened in the foot mode.

Since the first and second rotary doors 25, 26 are operated to the positions of FIGS. 1 and 5, the predetermined distance L1 on the door radial outward side is set between the tip portion of the front side seal portion 25*i* of the first rotary door 25 and the plane surface of the air distributing guide member 26*j* of the second rotary door 26. The defroster blowing-out air flows as shown by the arrow "d" of FIG. 5 while passing the air passage having this predetermined distance L1.

Accordingly, in the foot mode, the main flow (e.g., about 70 to 80%) of the conditioned air having a predetermined desirable temperature by mixing the cool air and the warm air in the air mixing portion 19 is directly introduced to the front-seat side foot opening portions 22, 22, and is also introduced toward the front-seat side foot opening portions 22, 22 by passing the inside space of the first rotary door 25.

The main flow is then blown-out to the foot side of a passenger through the front-seat side foot opening portions 22, 22 and the rear-seat side foot opening portion 23, and heats the foot portion of the passenger. Simultaneously, the remaining portion (e.g., about 20 to 30%) of the air conditioning air from the air mixing portion 19 is blown-out toward the inner face of the vehicle front windshield through the air passage of the predetermined distance L1 and the defroster opening portion 20, to obtain a fogging preventing action of the vehicle front windshield.

The foot mode is mainly used to blow-out the warm air toward the foot side of the passenger in a heating operation of the passenger compartment. When the air mix door 14 is operated in the solid line position of FIG. 1, a maximum heating state for completely opening the inlet ventilation path 15a of the heater core 15 and for completely closing the cool air passage 16 can be set. Thus, the entire amount of the blowing air can be heated by the heater core 15, and a warm air can be obtained. This warm air can be blown-out to the foot sides of passengers of the front and rear seats through the front-seat side foot opening portions 22, 22 and the rear-seat side foot opening portion 23, and can be also blown-out to the inner face of the vehicle front windshield through the defroster opening portion 20.

The cool air passage 16 can be opened by rotating the air mix door 14 in the counterclockwise direction from the solid line position of FIG. 1. Therefore, the temperature of the blowing-out air toward the passenger foot side and the vehicle front windshield can be arbitrarily adjusted by adjusting the air amount ratio of the warm air and the cool air, that is, by adjusting the rotating position of the air mix door 14.

In the foot mode, the predetermined distance L1 on the door radial outward side using the above air distributing guide member 26j is set to be smaller than the predetermined distance L2 in the door circumferential direction between the tip of the seal portion 25i and the seal face 29 as described above. Accordingly, the air amount flowing toward the defroster opening portion 20 is determined by the air passage having the predetermined distance L1 on the door radial outward side of the first rotary door 25. The area of this air passage is set by the product of the predetermined distance L1 and a passage width size (passage width size in the direction perpendicular to the paper face of FIG. 5).

Because the air amount flowing into the defroster opening portion 20 can be determined by the air passage having the predetermined distance L1 on the door radial outward side, the dispersion (difference) of the defroster blowing-out air amount (i.e., the air amount flowing into the defroster opening portion 20) can be effectively reduced even when the intermediate opening position of the first rotary door 25 is changed by the backlash of a link mechanism for a door operation, etc. These contents will next be described in detail on the basis of FIGS. 6 and 7.

Figure 6:
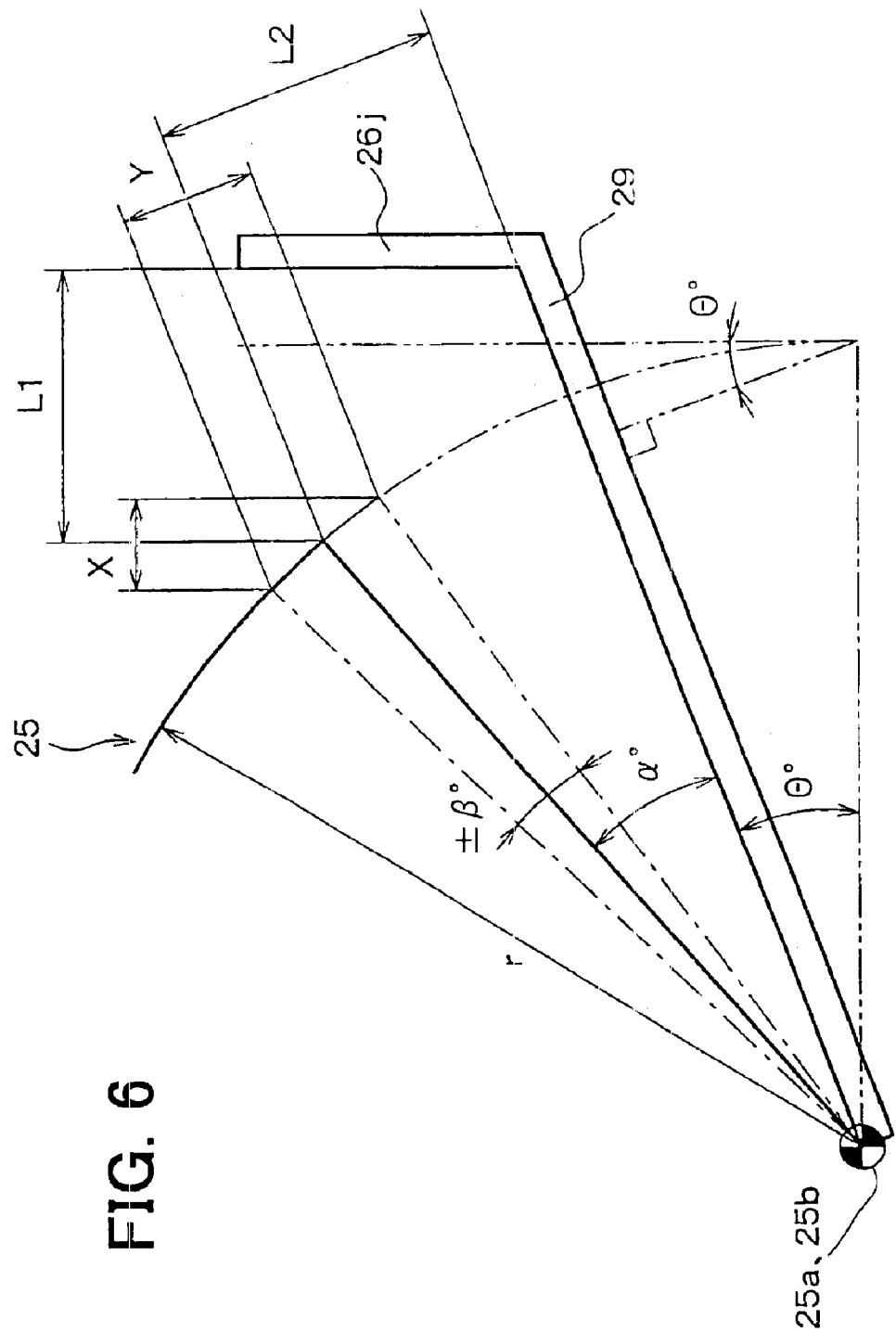
FIG. 6 is a schematic diagram for explaining an arrangement relationship between a first rotary door and an air guide member of a second rotary door, according to the first embodiment.
Figure 7:
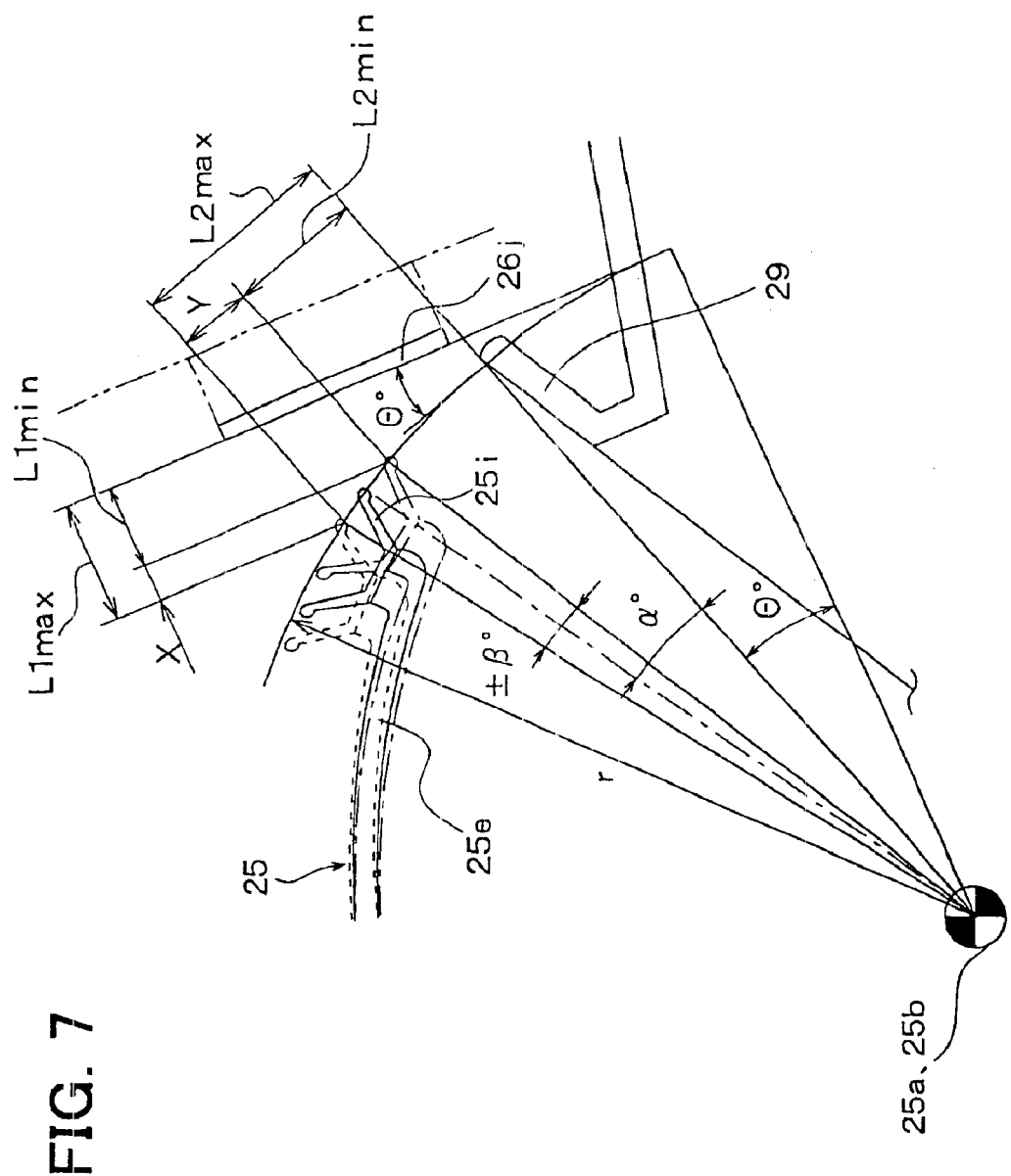
FIG. 7 is a schematic diagram for explaining a decrease effect of an air amount variation blown from a defroster opening portion in a foot mode, according to the first embodiment.

In FIGS. 6 and 7, "r" is the radius until the tip portion of the front side seal portion 25i of the first rotary door 25, and "α" is an angle formed by the seal face 29 and a straight line connecting the rotation center of the first rotary door 25 and the tip portion of the front side seal portion 25i. This angle α is an angle set when the first rotary door 25 is operated to the normal foot mode position. Further, θ is an angle formed by a line perpendicular to the seal face 29 and the plane surface of the air distributing guide member 26j.

The foot mode position of the first rotary door 25 is changed in an angle range of ±β by the backlash of the link mechanism, etc. The predetermined distance L1 at the door radial outward side of the first rotary door 25 on the air distributing guide member 26j is changed by X due to the change of the foot mode position of this first rotary door 25. In contrast to this, the predetermined distance L2 in the door circumferential direction of the first rotary door 25 on the side of the seal face 29 is changed by Y.

In FIG. 7, L1 max is a maximum value of the door radial outward side distance L1 generated when the foot mode position of the first rotary door 25 is moved to the angle position of α+β with respect to the seal face 29. In contrast to this, L1 min is a minimum value of the door radial outward side distance L1 generated when the foot mode position of the first rotary door 25 is moved to the angle position of α−β with respect to the seal face 29.

Further, L2 max is a maximum value of the door circumferential direction distance L2 generated when the foot mode position of the first rotary door 25 is moved to the angle position of α+β with respect to the seal face 29. In contrast to this, L2 min is a minimum value of the door circumferential direction distance L2 generated when the foot mode position of the first rotary door 25 is moved to the angle position of α−β with respect to the seal face 29.

The above L1 max, L1 min, L2 max and L2 min can be respectively calculated by the following formulas 1 to 4 using trigonometry.

$$L1\max = r[1-\cos(\alpha+\theta+\beta)] \quad \text{[Formula 1]}$$
$$L1\min = r[1-\cos(\alpha+\theta-\beta)] \quad \text{[Formula 2]}$$
$$L2\max = r\sin(\alpha+\beta) \quad \text{[Formula 3]}$$
$$L2\min = r\sin(\alpha-\beta) \quad \text{[Formula 4]}$$

The changing width X of the predetermined distance L1 on the door radial outward side due to the dispersion of the foot mode position of the first rotary door 25 can be calculated by the following formula 5.

$$X = L1\max - L1\min \quad \text{[Formula 5]}$$
$$= r[\cos(\alpha+\theta-\beta) - \cos(\alpha+\theta+\beta)]$$

Further, the changing width Y of the predetermined distance L2 in the door circumferential direction due to the dispersion of the foot mode position of the first rotary door can be calculated by the following formula 6.

$$Y = L2\max - L2\min \quad \text{[Formula 6]}$$
$$= r[\sin(\alpha+\beta) - \sin(\alpha-\beta)]$$

Next, the changing widths X and Y are calculated by applying α=13.5°, β=±3°, θ=16.3° and r=61.6 mm to the above formulas 5 and 6 as a concrete dimension example. Thus, the changing width X=3.2 mm of the predetermined distance L1 and the changing width Y=6.3 mm of the predetermined distance L2 are obtained.

Accordingly, even when the foot mode position (intermediate opening position) of the first rotary door 25 is changed by the angle range of ±β due to the backlash of the link mechanism, etc., the change of the defroster blowing-out air passage area due to this change of the door position can be reduced by half in comparison with a case in which the defroster blowing-out air passage area is prescribed by the predetermined distance L2 in the door circumferential direction. Accordingly, the change of the defroster blowing-out air amount can be effectively reduced.

FIG. 8 shows an operating state of the first and second rotary doors 25, 26 in the face mode. The first rotary door 25 is rotated by a predetermined angle in the counterclockwise direction from the above foot mode position, and both the seal portions 25h, 25i before and after the rotating direction of the first rotary door 25 are respectively and elastically press-attached to the case-side seal faces 27, 28 before and after the front-seat side foot opening portions 22, 22. Here, the seal faces 27, 28 are formed in a gate shape (U-shape), and both the seal portions 25h, 25i of the gate shape (U-shape) in the first rotary door 25 are entirely press-attached to the entire seal faces 27, 28 of this gate shape (U-shape) of the case 11.

As this result, the communication of the inside space of the gate shape of the first rotary door 25 and the outside space of the first rotary door 25 is interrupted. Since the front-seat side foot opening portions 22, 22 on both the left and right sides are communicated with the outside space of the gate shape of the first rotary door 25, the portion between the front-seat side foot opening portions 22, 22 and the space at the side of the air mixing portion 19 on the upstream side of the foot opening portions 22, 22 attains an air interrupting state by the first rotary door 25.

At this time, the first rotary door 25 completely opens the communication path 37, and the inside space of the gate shape of the first rotary door 25 is used for communicating the space of the air mixing portion 19 side and the communication path 37. Accordingly, the conditioned air of the air mixing portion 19 is directly introduced into the communication path 37, and passes through the inside space of the first rotary door 25 and flows into the communication path 37.

At this time, the second rotary door 26 is rotated by a predetermined angle in the clockwise direction from the above foot mode position, and both the seal portions 26h, 26i before and after the rotating direction of the second rotary door 26 are respectively and elastically press-attached to the seal faces 31, 30 on the case side. Thus, the defroster opening portion 20 is completely closed and the face opening portion 21 is completely opened by the second rotary door 26. Accordingly, the conditioned air of the communication path 37 is blown-out to the upper half side of the body of a passenger from only the face opening portion 21.

The face mode is mainly used to blow-out the cool air to the upper half side of the body of the passenger in a cooling operation of the passenger compartment. In FIG. 1, if the air mix door 14 is operated and moved to the one-dotted chain line position, a maximum cooling state for completely closing the inlet ventilation path 15a of the heater core 15 and for completely opening the cool air passage 16 can be set by the air mix door 14. Thus, the entire amount of the cooling air cooled by the evaporator 13 can be blown-out to the upper half side of the body of the passenger from the face opening portion 21 by passing through the cool air passage 16.

The inlet ventilation path 15a of the heater core 15 is opened by rotating the air mix door 14 in the clockwise direction from the maximum cooling state shown by the one-dotted chain line of FIG. 1. Accordingly, the face blowing-out air temperature can be arbitrarily adjusted by adjusting the air amount ratio of the warm air heated by the heater core 15 and the cool air passing through the cool air passage 16 by adjusting the rotating position of the air mix door 14.

In the face mode, the air distributing guide member 26j is positioned at a side of the defroster opening portion 20 from the position above the case-side seal face 29 by the movement of the second rotary door 26 to the position of the defroster opening portion 20. Further, the plane surface of the air distributing guide member 26j becomes approximately parallel to the air flow passing through the communication path 37. Accordingly, there is almost no case in which the air distributing guide member 26j becomes a ventilation pressure loss of the air flow passing through the communication path 37 and directed onto the side of the face opening portion 21. Accordingly, the reduction in the blowing-out air amount at the maximum cooling state due to the air distributing guide member 26j is restrained and maximum cooling performance of the passenger compartment can be effectively improved.

Figure 9:
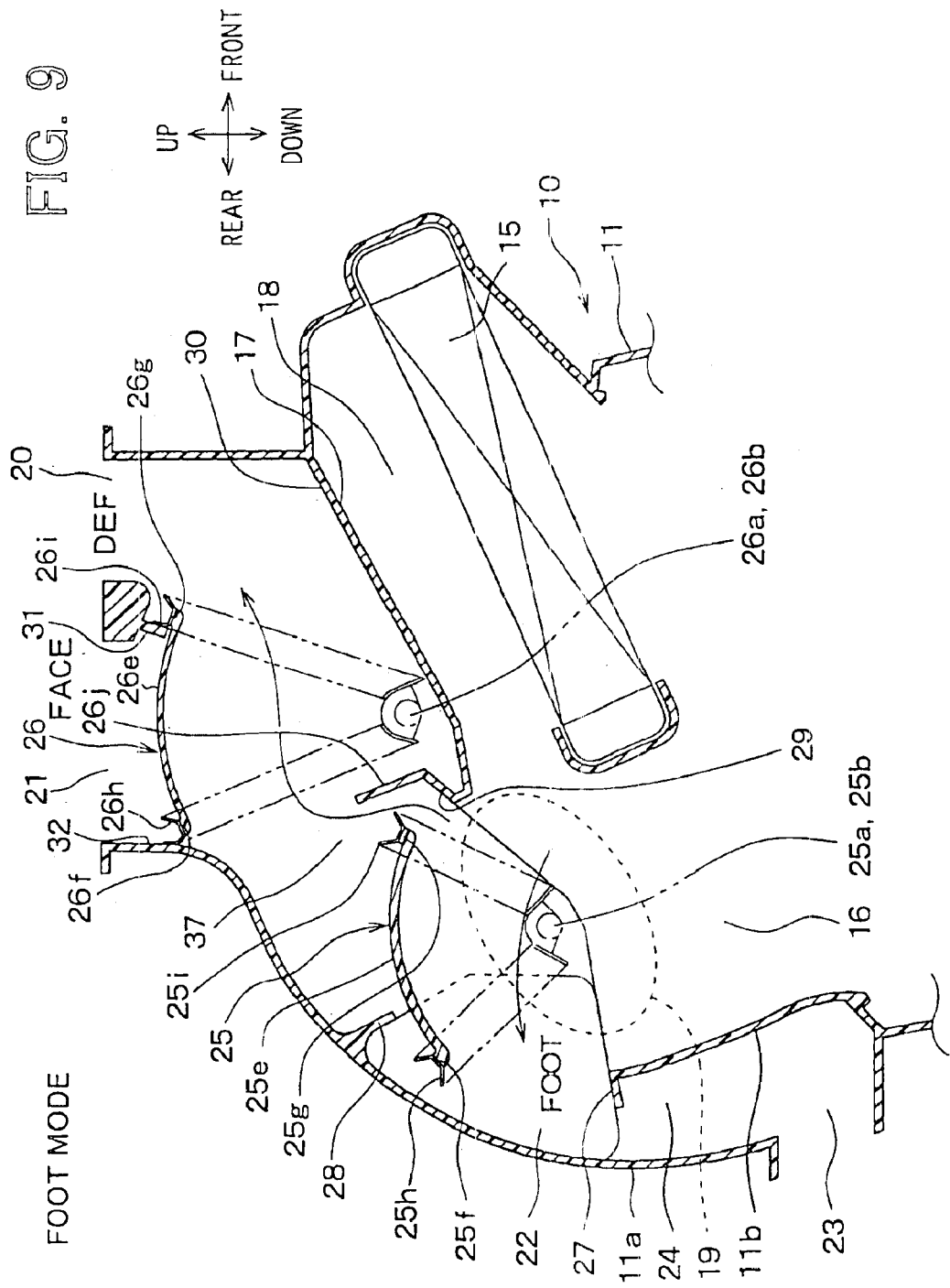
FIG. 9 is cross-sectional view showing a part of an air conditioning unit in a foot mode, according to a comparison example of the first embodiment.
Figure 10:
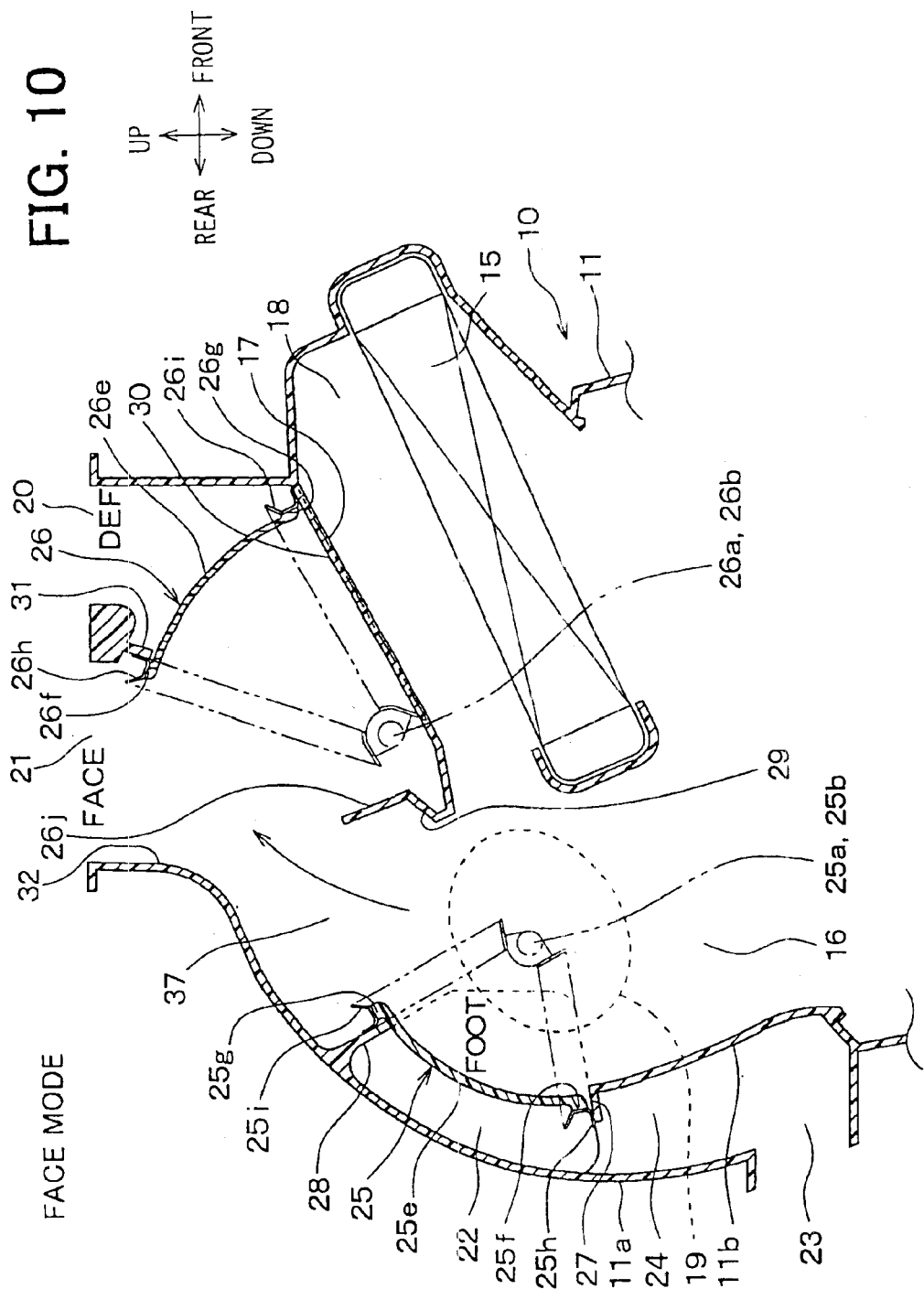
FIG. 10 is cross-sectional view showing a part of an air conditioning unit in a face mode, according to the comparison example of the first embodiment.

If the air distributing guide member 26j is formed so as to be continued to the case-side seal face 29 as in the comparison examples of FIGS. 9 and 10, the air distributing guide member 26j is always fixed to the foot mode position of FIG. 9 as it is. As this result, in the face mode of FIG. 10, the air distributing guide member 26j is projected into the air flow directed toward the face opening portion 21, thereby increasing the ventilation pressure loss due to the air distributing guide member 26j. Thus, the blowing-out air amount at the maximum cooling state is reduced and the maximum room cooling performance of the passenger compartment is reduced. However, in accordance with this embodiment, no disadvantages as in the comparison examples of FIGS. 9 and 10 are caused because the air distributing guide member 26j is constructed as a movable guide member displaced together with the second rotary door 26.

Figure 11:
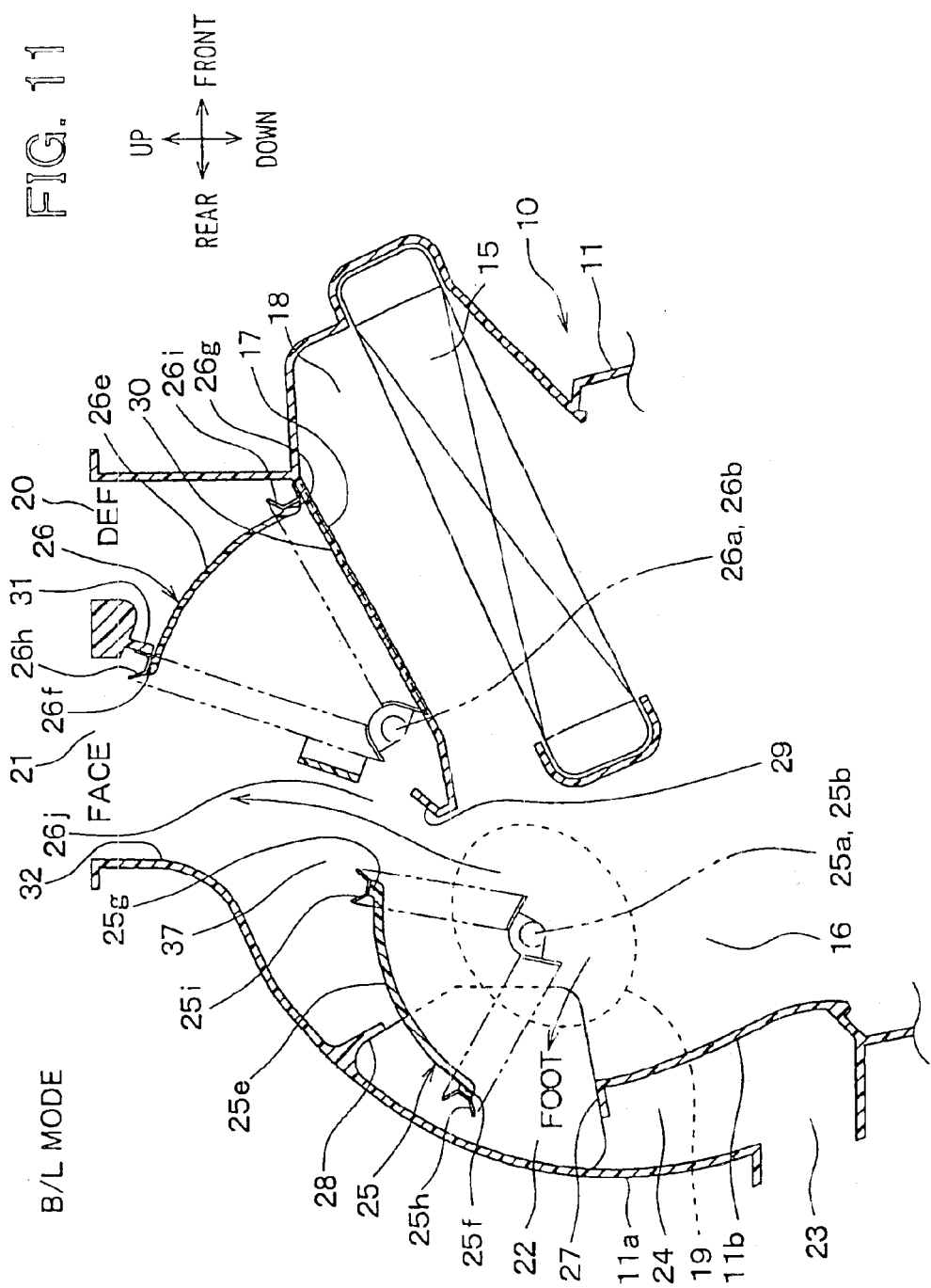
FIG. 11 is a cross-sectional view showing a main part of the air conditioning unit of FIG. 1, in a bi-level mode.

FIG. 11 shows an operating state of the first and second rotary doors 25, 26 in a bi-level mode. The first rotary door 25 is rotated in the clockwise direction by a predetermined angle from the rotating position in the face mode of FIG. 8, and the rear side seal portion 25h of the first rotary door 25 is located in the intermediate position of the case-side seal faces 27, 28 before and after the front-seat side foot opening portions 22, 22.

Thus, both the flow paths of the front-seat side foot opening portions 22, 22 and the communication path 37 attain a half opening state. In contrast to this, because the second rotary door 26 maintains the rotating position in the face mode of FIG. 8 as it is, the complete closing state of the defroster opening portion 20 and the complete opening state of the face opening portion 21 are maintained.

Accordingly, the conditioned air from the air mixing portion 19 flows to the flow paths of the front-seat side foot opening portions 22, 22 and is also simultaneously introduced to the face opening portion 21 by passing through the communication path 37. Thus, the conditioned air is blown-out to the foot sides of passengers of the front and rear seats through the front-seat side foot opening portions 22, 22 and the rear-seat side foot opening portion 23, and can be simultaneously blown-out to the upper half side of the body of each passenger from the face opening portion 21.

The bi-level mode is mainly used in intermediate temperature periods of spring and autumn. Therefore, the air mix door 14 is generally operated and moved to the intermediate rotating position between the maximum heating position shown by the solid line of FIG. 1 and the maximum cooling position shown by the one-dotted chain line of FIG. 1, and adjusts the blowing-out air temperature to an intermediate temperature area.

Figure 12:
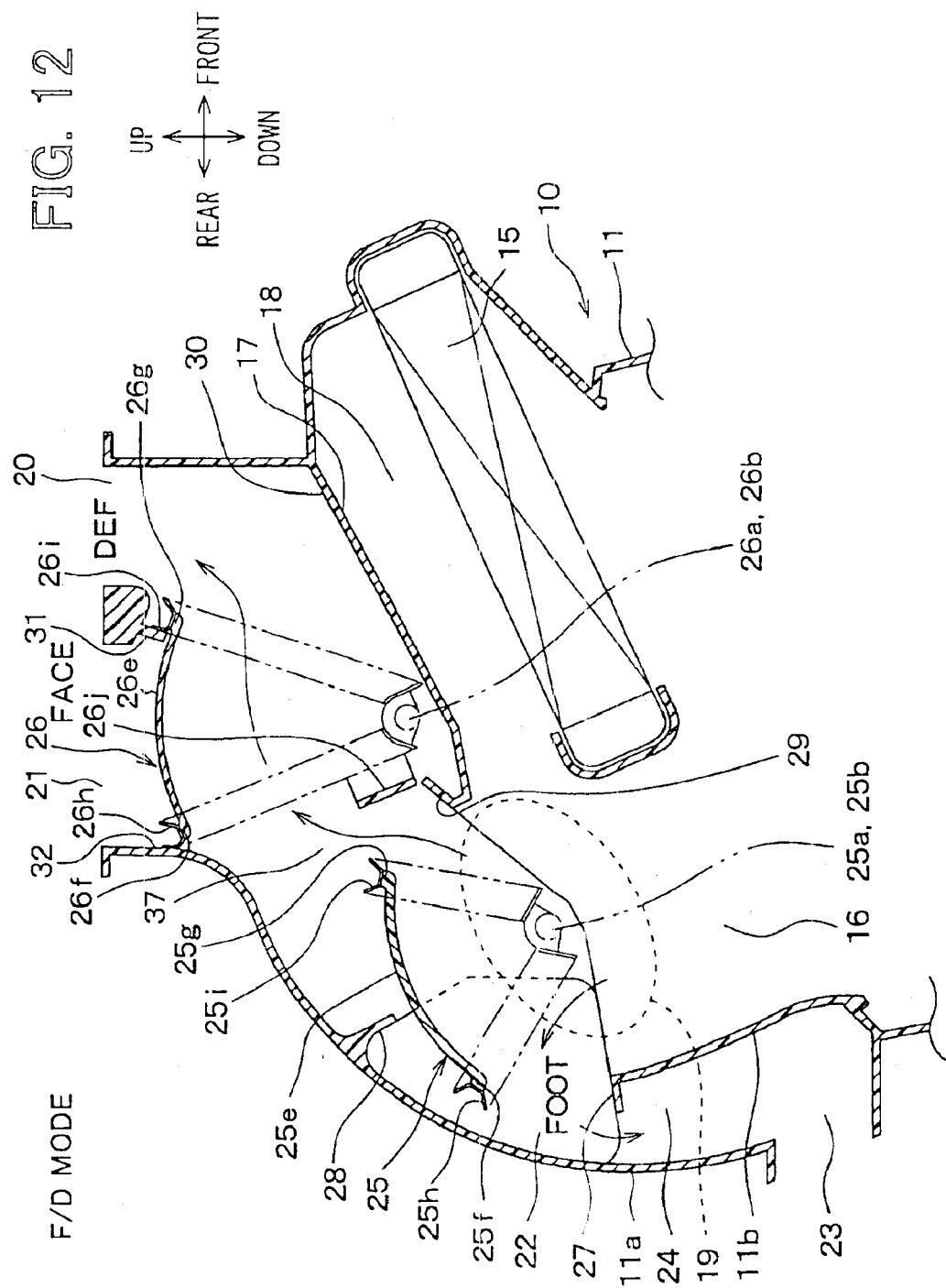
FIG. 12 is a cross-sectional view showing a main part of the air conditioning unit of FIG. 1, in a foot/defroster mode.

Next, FIG. 12 shows an operating state in a foot/defroster mode. Since the first rotary door 25 is maintained in the same position as the bi-level mode of FIG. 11, both the flow paths of the front-seat side foot opening portions 22, 22 and the communication path 37 attain the half opening state by the first rotary door 25. In contrast to this, the second rotary door 26 is rotated by a predetermined angle in the counterclockwise direction from the rotating position in the bi-level mode of FIG. 11, and completely opens the defroster opening portion 20 and completely closes the face opening portion 21.

Accordingly, the conditioned air from the air mixing portion 19 flows to the flow paths of the front-seat side foot opening portions 22, 22, and the conditioned air is also introduced to the defroster opening portion 20 by passing through the communication path 37 and the inside space of the second rotary door 26. Thus, the conditioned air can be blown-out to the foot sides of the passengers of the front and rear seats through the front-seat side foot opening portions 22, 22 and the rear-seat side foot opening portion 23, and can be simultaneously blown-out to the inner face of the vehicle front windshield from the defroster opening portion 20. Thus, a fogging of the vehicle front windshield can be prevented by blowing-out the conditioned air to the inner face of the vehicle front windshield.

Figure 13:
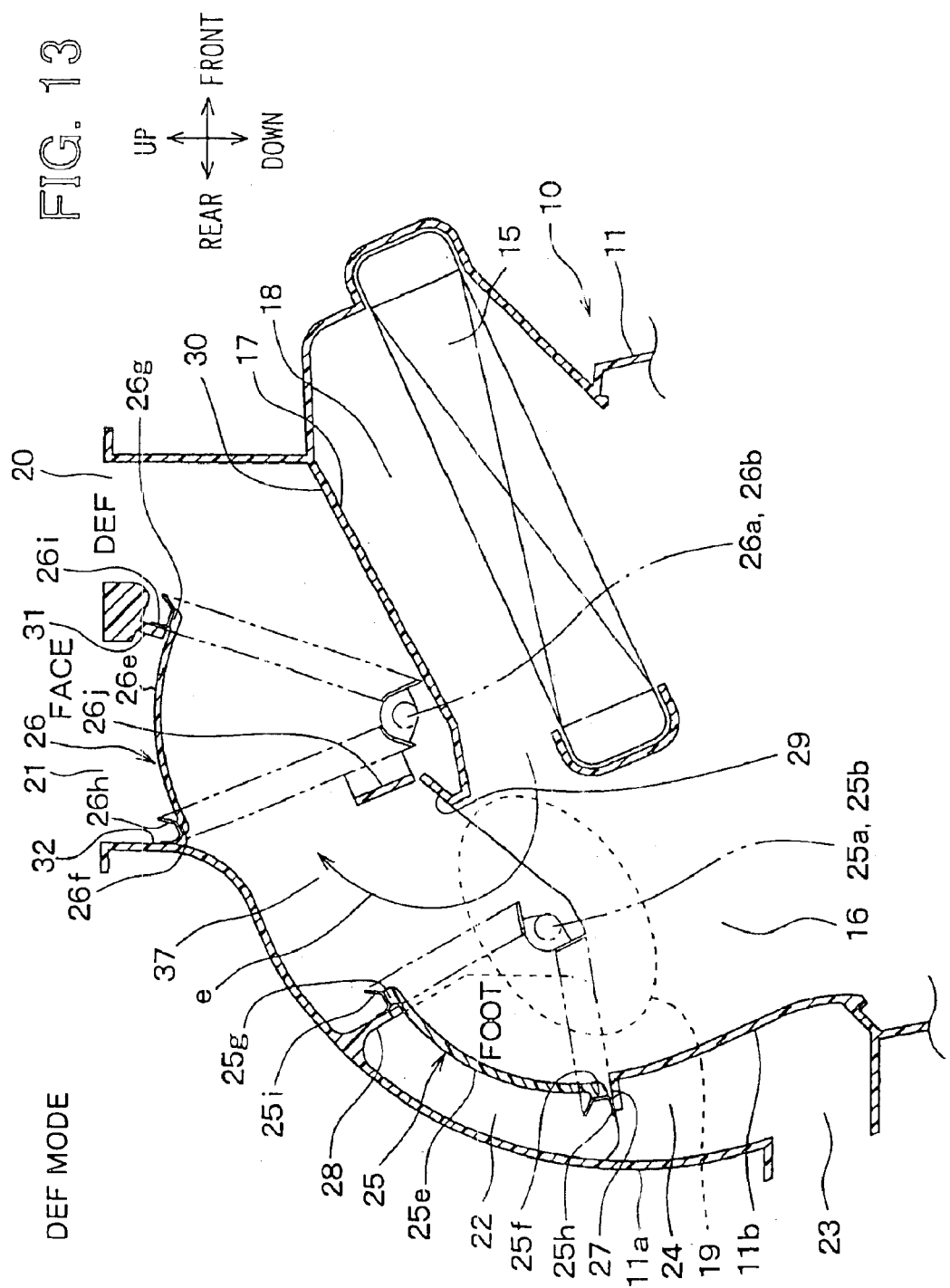
FIG. 13 is a cross-sectional view showing a main part of the air conditioning unit of FIG. 1, in a defroster mode.

FIG. 13 shows an operating state in the defroster mode. When the defroster mode is set, the first rotary door 25 is rotated by a predetermined angle in the counterclockwise direction from the rotating position of FIG. 12, and is moved to the same position as the face mode of FIG. 8. Accordingly, the flow paths of the front-seat side foot opening portions 22, 22 are completely closed and the communication path 37 becomes in the complete opening state by the first rotary door 25. In contrast to this, the second rotary door 26 maintains the rotating position of FIG. 12 as it is. Accordingly, the complete opening state of the defroster opening portion 20 and the complete closing state of the face opening portion 21 are maintained.

Accordingly, the air mixing portion 19 is communicated with only the defroster opening portion 20 through the communication path 37 and the inside space of the second rotary door 26. Accordingly, the entire amount of the conditioned air from the air mixing portion 19 is blown-out to the inner face of the vehicle front windshield from the defroster opening portion 20 so that it can prevent the vehicle front windshield from being fogged.

In the defroster mode, the warm air is normally blown-out to the front windshield to prevent the fogging of the vehicle front windshield. Accordingly, the warm air from the warm air passage 18 is mainly used for defogging the vehicle front windshield. Since the direction of the warm air flow from the warm air passage 18 is changed in a U-turn shape near the air mixing portion 19, the air flow in the defroster mode becomes a flow greatly curved at the side of the first rotary door 25 as shown by the arrow "e" of FIG. 13 by the influence of this warm air flow of the U-turn shape.

As a result, in the defroster mode, the influence of the air distributing guide member 26j on the air flow directed to the defroster opening portion 20 is very small even when the air distributing guide member 26j of the second rotary door 26 is located between the air mixing portion 19 and the defroster opening portion 20.

Further, there is almost no ventilation pressure loss increase due to the air distributing guide member 26j because the distance between the upper end face of the air distributing guide member 26j and the outer circumferential door face 26e is set so as to have a ventilation area equal to or greater than that of the defroster opening portion 20. Therefore, the conditioned air on the side of the air mixing portion 19 smoothly flows to the defroster opening portion 20 by passing through the flow path between the upper end face of the air distributing guide member 26j and the outer circumferential door face 26e. Accordingly, no reduction in the defroster blowing-out air amount due to the air distributing guide member 26j is almost caused in the defroster mode.

Next, the other advantages of the first embodiment except for the above operating effects will be described.

(1) In the first embodiment, the operating force in air-outlet mode switching can be reduced since the first and second rotary doors 25, 26 are used as doors for switching the air outlet modes. In the first and second rotary doors 25, 26, outer circumferential door faces 25e, 26e are rotated in the direction perpendicular to the air flow around the rotary shafts 25a, 25b, 26a, 26b as centers, to open and close respective opening portions 20, 21, 22. Accordingly, it is not necessary to rotate the doors so as to be opposed to the air flow as in a cantilever plate door, and there is no influence of the door weight.

Further, the seal portions 25h, 25i, 26h, 26i of the lip seal type of the first and second rotary doors 25, 26 are press-attached to the case-side seal faces 27–32 in only the complete closing positions of the respective opening portions 20, 21, 22, and are separated from the case-side seal faces 27–32 during the door rotation. Accordingly, no sliding friction of the seal portions 25h, 25i, 26h, 26i is caused by the door rotating operation.

Thus, as described above, the operating force in the air-outlet mode switching can be effectively reduced in comparison with the air-outlet mode door using the cantilever plate door.

(2) The first and second rotary doors 25, 26 are formed into the gate shape by the outer circumferential door faces 25e, 26e and the side plate portions 25c, 25d, 26c, 26d and are arranged such that the rotary shafts 25a, 25b, 26a, 26b are projected outward on the left and right outsides from the side plate portions 25c, 25d, 26c, 26d. Accordingly, no projecting-out portion preventing the ventilation is formed in the inside space of the gate shape of the first rotary door 25, and this inside space can be utilized as a flow path of the conditioned air directed to each of the opening portions 20, 21, 22 as it is.

As described above, there is almost no case in which the ventilation pressure loss is increased in each air outlet mode with respect to the air distributing guide member 26j of the second rotary door 26.

Accordingly, in comparison with the air-outlet mode door using the conventional butterfly door, ventilation resistance is reduced and the blowing-out air amount from each of the opening portions 20, 21, 22 can be increased, and blowing noises (air cutting sound) can be reduced.

Further, in accordance with the rotary doors 25, 26 of the first embodiment, because no phenomenon of partitioning the cool air and the warm air as in a conventional butterfly door is generated, the temperature dispersion of the blowing-out air from each of the opening portions 20, 21, 22 can be reduced.

(3) Because the first and second rotary doors 25, 26 open and close the flow path between the inside space and the outside space of the gate shape of the doors, the opening portions 20, 21, 22 can be arranged on both the outer circumferential sides of the outer circumferential door faces 25e, 26e and the left and right outsides of the side plate portions 25c, 25d, 26c, 26d. Concretely, the left and right foot opening portions 22 can be arranged on the left and right outsides of the side plate portions 25c, 25d of the first rotary door 25.

Thus, the upstream flow path (flow path on the side of the air mixing portion 19) of the first rotary door 25 can be linearly communicated with the left and right foot opening portions 22, and a bending pressure loss of the flow path to the foot opening portion 22 can be effectively reduced so that the foot blowing-out air amount can be effectively increased.

(4) The first and second rotary doors 25, 26 are arranged in the air-outlet mode switching mechanism, and the foot opening portion 22 is opened and closed by the first rotary door 25, and the defroster opening portion 20 and the face opening portion 21 are opened and closed by the second rotary door 26. Accordingly, with respect to the foot opening portion 22, an arbitrary arranging place can be independently set separately from the rotating locus (i.e., the arranging parts of the defroster opening portion 20 and the face opening portion 21) of the outer circumferential door face 26e of the second rotary door 26.

Further, the first and second rotary doors 25, 26 can be made very compact in comparison with a single rotary door for opening and closing all the three air-outlet opening portions 20 to 21. Thus, vehicle mounting property of an air conditioning unit can be improved in cooperation with the above contents.

(5) When no air distributing guide member 26j is arranged in the second rotary door 26, the parts on the sides of the rotary shafts 26a, 26b in the left and right side plate portions 26c, 26d are openly separated from each other as they are in the gate shape (U-shape) that is constructed by the outer circumferential door face 26e and the left and right fan-shaped side plate portions 26c, 26d. Accordingly, in this case, the insufficiency of axial strength of the second rotary door 26 is easily caused.

In contrast to this, in the first embodiment, the parts on the sides of the rotary shafts 26a, 26b in the left and right side plate portions 26c, 26d are integrally connected to each other by the air distributing guide member 26j. Accordingly, the air distributing guide member 26j acts as a beam member for reinforcing the axial strength of the second rotary door 26. Accordingly, the second rotary door 26 can be reinforced by the air distributing guide member 26j.

In the first embodiment, the rear-seat side foot opening portion 23 is arranged in addition to the front-seat side foot opening portions 22, 22. However, the present invention can be similarly embodied even in a case in which the rear-seat side foot opening portion 23 is disused and only the front-seat side foot opening portions 22, 22 are arranged.

(Second Embodiment)

In the first embodiment, the air distributing guide member 26j is formed in the shape of a flat plate. However, in the second embodiment, as shown in FIGS. 14 and 15, the air distributing guide member 26j is formed in an arc shape along the rotating locus of the tip portion of the front side seal portion 25i of the first rotary door 25.

Figure 14:
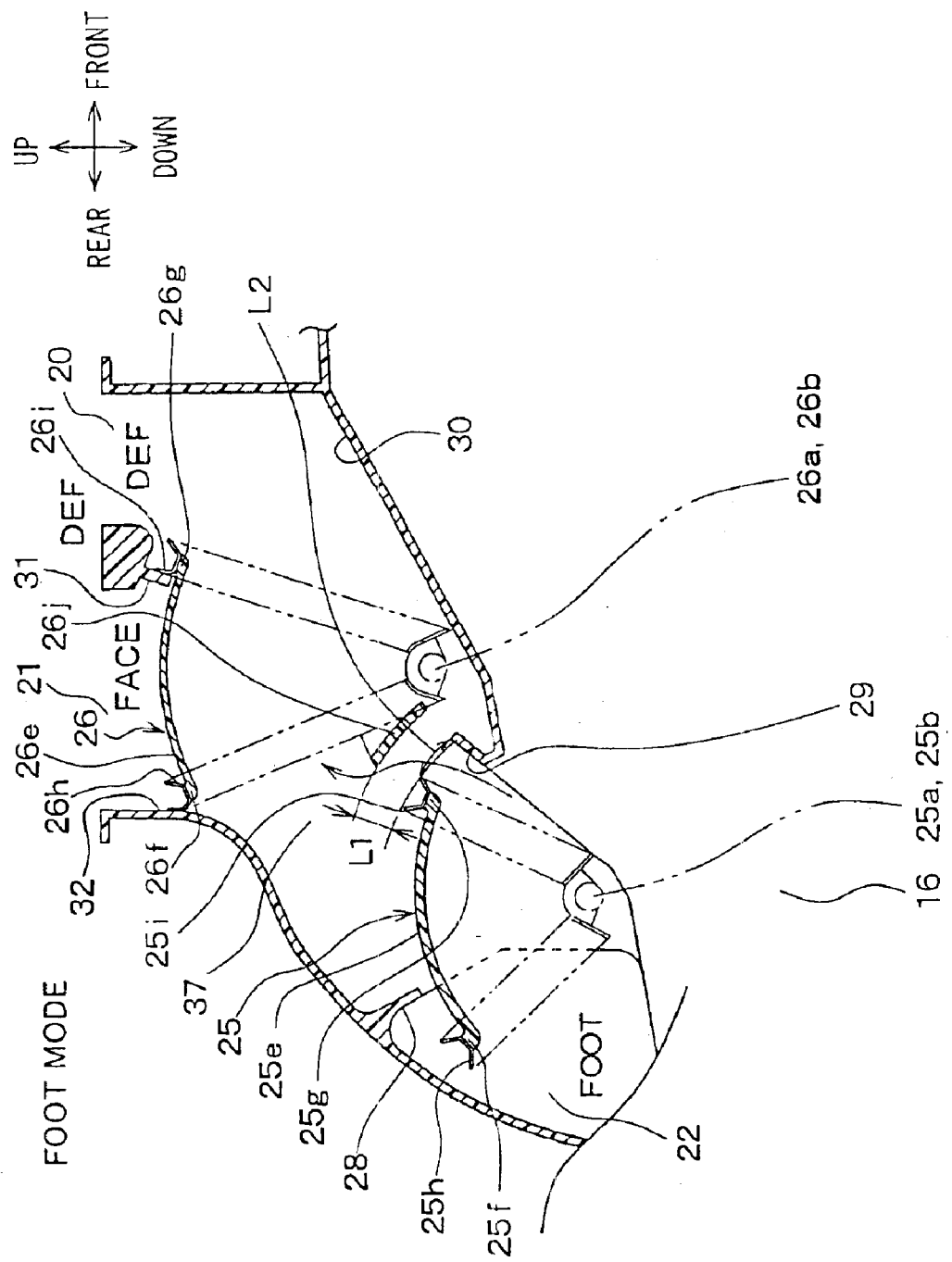
FIG. 14 is a cross-sectional view showing a main part of an air conditioning unit in a foot mode, in accordance with a second embodiment of the present invention.

Thus, as shown in FIG. 14, even when the foot mode position of the first rotary door 25 is changed in the above angle range of ±β, the distance L1 between the air distributing guide member 26j and the tip portion of the front side seal portion 25i of the first rotary door 25 can be always constantly maintained. Accordingly, it is possible to dissolve the change of the defroster blowing-out air amount due to the change of the rotation position of the first rotary door 25 in the foot mode.

Figure 15:
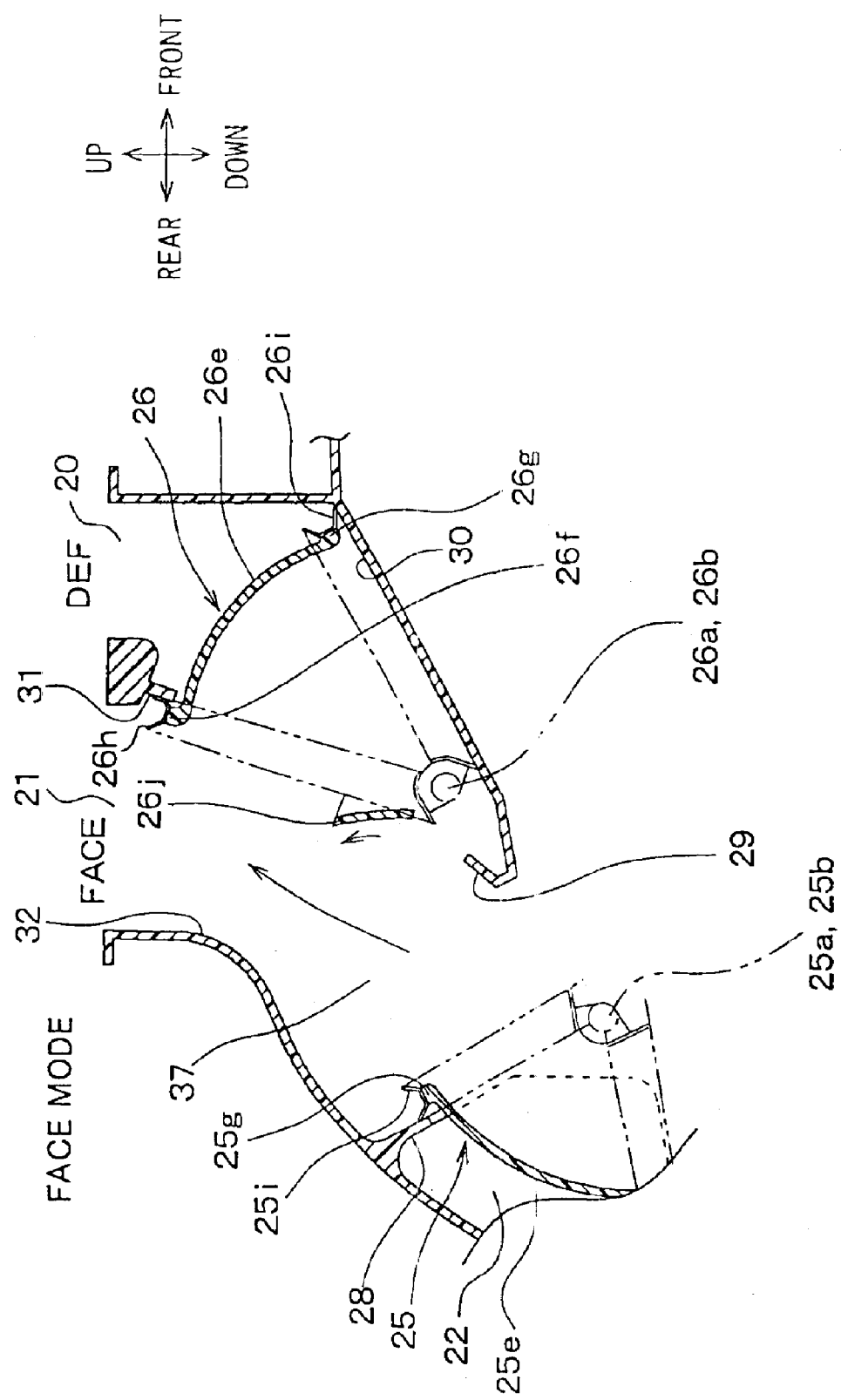
FIG. 15 is a cross-sectional view showing a main part of the air conditioning unit in a face mode, in accordance with the second embodiment.

In the second embodiment of the present invention, as shown in FIG. 15, the upper end portion of the arc shape of the air distributing guide member 26j is slightly projected into the air flow directed to the face opening portion 21 in the face mode. Therefore, a reduction in the air amount blown from the face opening portion 21 is caused.

Accordingly, it is necessary to consider the pressure loss increase in the face mode in the design of a concrete shape of the air distributing guide member 26j of the second embodiment.

In the second embodiment, the other parts are similar to those of the above-described first embodiment.

(Third Embodiment)

In the above-described first and second embodiments, both the first door on the air flow upstream side and the second door on the air flow downstream side are constructed by the rotary doors 25, 26 having the outer circumferential door faces 25e, 26e rotated integrally with the rotary shafts in parts separated by predetermined amounts from the centers of the rotary shafts 25a, 25b, 26a, 26b to the radial outward side. In the third embodiment, as shown in FIG. 16, only the first door on the air flow upstream side is constructed by the rotary door 25, and the second door on the air flow downstream side is constructed by a plate door 260 of a cantilever type rotated around a rotary shaft 261 as a center.

The third embodiment will be more concretely described with reference to FIG. 16. The plate door 260 has a door base plate portion 262 of a rectangular shape manufactured by resin. Elastic seal materials 263, 264 are adhered and fixed to both front and rear faces of this door base plate portion 262. The rotary shaft 261 is integrally connected to one side portion of the rectangular shape of the door base plate portion 262. The rotary shaft 261 is rotatably supported in the upper face portion of the case 11, that is, the wall portion of an intermediate part between the defroster opening portion 20 and the face opening portion 21.

An air distributing guide member 266 is connected to the door base plate portion 262 through a connecting arm 265. When the plate door 260 is rotated to a foot mode position (the solid line position of FIG. 16), the air distributing guide member 266 is arranged so as to be oppositely separated by a predetermined distance L1 from the front side seal portion 25i of the rotary door 25 on the door radial outward side of the first rotary door 25. The rotary shaft 261 of the plate door 260, the door base plate portion 262, the connecting arm 265 and the air distributing guide member 266 can be integrally molded by resin.

Figure 16:
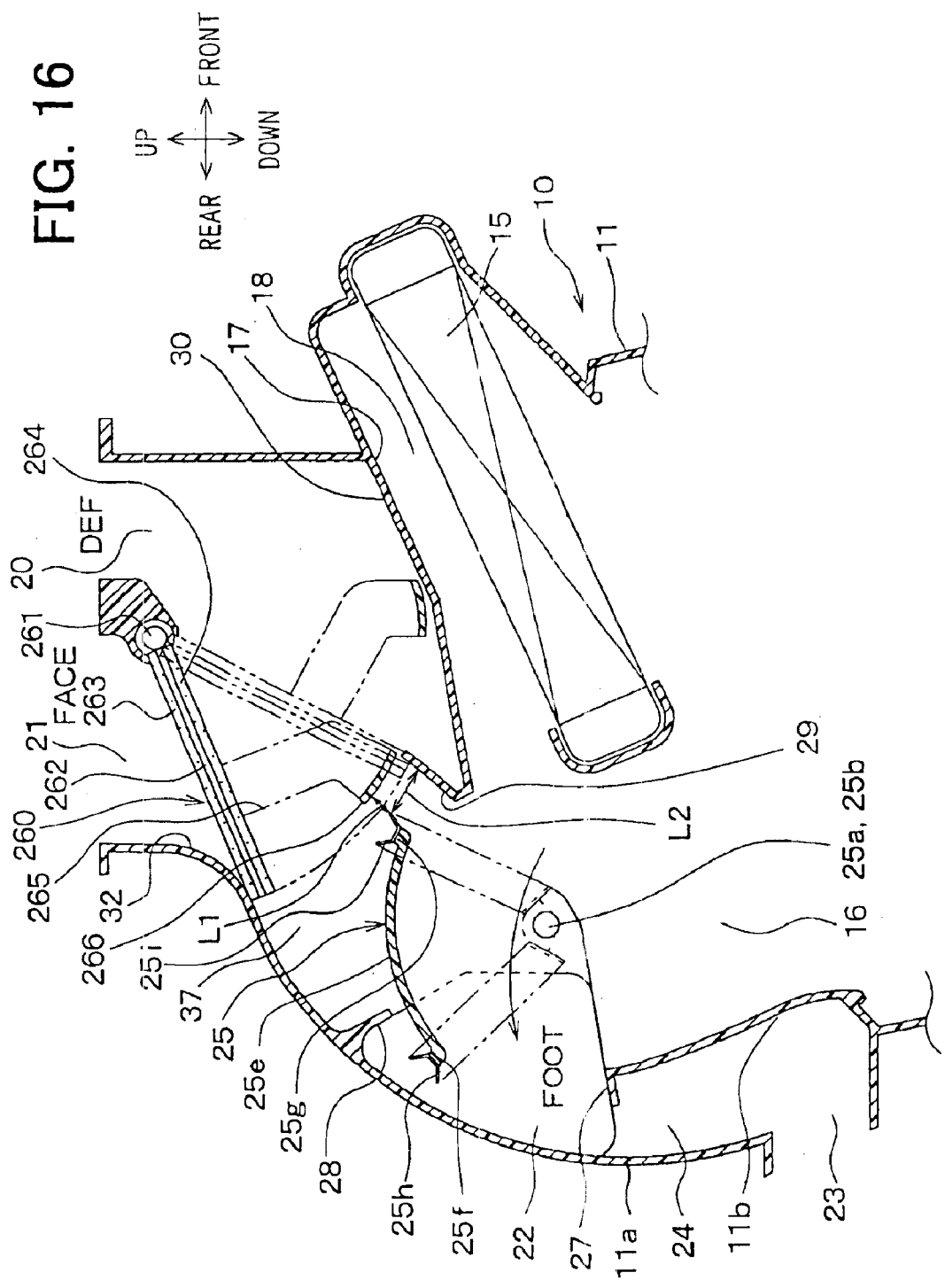
FIG. 16 is a cross-sectional view showing a main part of an air conditioning unit in a foot mode, according to a third embodiment of the present invention.

The solid line position of FIG. 16 shows an operating state in the foot mode. An elastic seal material 263 on the upper side of the door base plate portion 262 of the plate door 260 is press-attached to (press-contacts) the case-side seal face 32, and the face opening portion 21 is completely closed and the defroster opening portion 20 is completely opened.

The air distributing guide member 266 of the plate door 260 is moved to a position oppositely separated by the predetermined distance L1 from the front side seal portion 25i of the rotary door 25 on the door radial outward side. Thus, the air distributing guide member 266 has the same effect as the air distributing guide member 26j of the above-described first embodiment. Accordingly, even when the second door is the plate door 260, it is possible to reduce the change in the defroster blowing-out air amount due to the change in the position of the rotary door 25 in the foot mode.

In contrast to this, the two-dotted chain line position of the plate door 260 of FIG. 16 is an operating position of the face mode and the bi-level mode. The elastic seal material 264 on the lower side of the door base plate portion 262 is press-attached to the case-side seal face 29 so that the defroster opening portion 20 is completely closed and the face opening portion 21 is completely opened.

At this time, because the air distributing guide member 266 is moved to an inlet side of the defroster opening portion 20 in the complete closing state, no air distributing guide member 266 becomes a ventilation pressure loss. In the third embodiment, the other parts are similar to those of the above-described first embodiment.

(Other Embodiments)

Although the present invention has been fully described in connection with the preferred embodiments thereof with reference to the accompanying drawings, it is to be noted that various changes and modifications will become apparent to those skilled in the art.

For example, in the above-described embodiments, the foot opening portion 22 and the communication path 37 are opened and closed by the rotary door 25 constituting the first door on the upstream air side, and the defroster opening portion 20 and the face opening portion 21 are opened and closed by the rotary door 26 or the plate door 260 constituting the second door on the downstream air side. However, the face opening portion 21 and the communication path 37 can be arranged to be opened and closed by the rotary door 25 on the upstream air side, and the defroster opening portion 20 and the foot opening portion 22 can be arranged to be opened and closed by the rotary door 26 or the plate door 260 constituting the second door on the downstream air side.

When the arrangement of the air-outlet opening portions is changed in this way, the dispersion (difference) of the foot blowing-out air amount in the bi-level mode can be reduced.

That is, the foot opening portion 22 is arranged in the position (position on the vehicle front side) of the defroster opening portion 20 in each of the above embodiments, and the defroster opening portion 20 is arranged in the position (position on the vehicle rear side) of the face opening portion 21 in each of the above embodiments. Then, the rotary door 25 on the upstream air side is operated in an intermediate opening position, and both the flow path on the side of the foot opening portion 22 and the communication path 37 are set to a half opening state. The rotary door 26 on the downstream air side or the plate door 260 opens the foot opening portion 22 on the vehicle front side and operates and moves the defroster opening portion 20 on the vehicle rear side to the closing position.

The operating position of this downstream side rotary door 26 or the plate door 260 is the same position as that in the foot mode in the above embodiments. Therefore, the air distributing guide member 26j, 266 is in a state where the air distributing guide member 266 is oppositely separated by the predetermined distance L1 from the radial outward side of the upstream rotary door 25. Accordingly, the air distributing guide member 26j, 266 has the same operation effect in the foot mode as that in each of the above embodiments, and can reduce the dispersion (difference) of the foot blowing-out air amount in the bi-level mode.

In the above-described first and second embodiments, the outer circumferential door faces 25e, 26e of the rotary doors 25, 26 are formed in the arc shape with the rotary shafts 25a, 25b, 26a, 26b as centers. However, the seal function of the rotary doors 25, 26 can be performed by the seal portions 25h, 25i, 26h, 26i even when the outer circumferential door faces 25e, 26e are formed into flat faces instead of the arc shape. Accordingly, the outer circumferential door faces 25e, 26e can be formed in a flat shape.

In the above-described first embodiment, thermoplastic elastomer is used as the materials of the seal portions 25h, 25i, 26h, 26i of the rotary doors 25, 26. Further, the seal portions 25h, 25i, 26h, 26i of the lip seal shape are integrally molded as an example when the outer circumferential door faces 25e, 26e, the side plate portions 25c, 25d, 26c, 26d, and the rotary shafts 25a, 25b, 26a, 26b are molded by resin. However, a packing material molded in advance by foaming resin, etc. can be used as the seal portions 25h, 25i, 26h, 26i, and this packing material can be fixedly attached to the peripheral edge portions of the base plate portions of the rotary doors 25, 26 by adhesion, etc.

Further, in the first embodiment, the air mix door 14 is constructed by a cantilever plate door as an example. However, the air mix door 14 can be also constructed by a slide type door performing a reciprocating operation instead of the rotating operation, a film door having a flexibility.

Further, in the first embodiment, both the evaporator 13 and the heater core 15 are approximately arranged in the horizontal direction as an example. However, the arrangement states of the evaporator 13 and the heater core 15 are not limited to the approximately horizontal arrangement, but can be variously changed to a vertical arrangement, etc.

In the above-described embodiments, the air passage switching device of the present invention is typically used as the air-outlet mode selecting device of the vehicle air conditioner. However, the air passage switching device of the present invention can be used for the other devices for opening and closing an air passage.

Such changes and modifications are to be understood as being within the scope of the present invention as defined by the appended claims.

What is claimed is:

1. An air passage switching device comprising:
    a case for defining an air passage through which air flows, the case having a first opening portion and a plurality of second opening portions through which air in the air passage flows to an outside of the case;
    a first door disposed in the case for opening and closing the first opening portion and a communication path that is provided within the case upstream of the second opening portions, wherein the first door is a rotary door including a rotation shaft, an outer peripheral door surface separated from a center axial line of the rotation shaft to a radial outside by a predetermined distance and two side plates connected to the rotation shaft and end portions of the outer peripheral surface in an axial direction of the rotation shaft;
    a second door disposed downstream of the first door and the communication path, for opening and closing the second opening portions, the second door being operatively linked with the first door; and
    an air distributing guide member provided in the second door to be moved integrally with the second door, wherein:
    the rotary door is disposed to be rotatable between a first position where the first opening portion is closed by the rotary door, and a second position where the communication path is closed by the outer peripheral door surface of the rotary door;
    when the rotary door is moved to a predetermined position between the first position and the second position, both of the first opening portion and the communication path are opened, and the second door opens at least one of the second opening portions; and
    the air distributing guide member is positioned on the second door, opposite to the outer peripheral door surface of the rotary door, to be separated from the outer peripheral door surface by a predetermined distance (L1) to a radial outside, when the rotary door is moved to the predetermined position.

2. The air passage switching device according to claim 1, wherein the air distributing guide member has a flat surface.

3. The air passage switching device according to claim 1, wherein the air distributing guide member has a circular arc shape along a rotation locus of the outer peripheral door surface.

4. The air passage switching device according to claim 1, wherein:
the second opening portions include a door side opening portion arranged at a side close to the rotary door, and an anti-door side opening portion arranged at a side far away from the rotary door than the door side opening portion;
when the rotary door is moved to the predetermined position, the second door closes the door side opening portion and opens the anti-door side opening portion, and the air distributing guide member is positioned opposite to the outer peripheral door surface of the rotary door to be separated from the outer peripheral door surface by the predetermined distance; and
when the second door is moved to a position where the door side opening portion is opened and the anti-door side opening portion is closed, the air distributing guide member is moved at a position offset from an air flow toward the door side opening portion.

5. The air passage switching device according to claim 1, wherein
the second door is a rotary door including a rotation shaft, an outer peripheral door surface separated from a center axial line of the rotation shaft to a radial outside by a predetermined distance and two side plates connected to the rotation shaft and end portions of the outer peripheral surface in an axial direction of the rotation shaft.

6. The air passage switching device according to claim 5, wherein the air distributing guide member is a beam member that extends in the axial direction to be connected to the two side plates.

7. The air passage switching device according to claim 1, wherein the second door is a plate door having a rotation shaft and a plate member rotatable around the rotation shaft.

8. An air conditioner for a vehicle having a passenger compartment, comprising
a case for defining an air passage through which air flows, the case having a first opening portion and a plurality of second opening portions through which air in the air passage flows into different portions in the passenger compartment;
a heat exchanger disposed upstream of the first opening portion and the second opening portion in the case for performing a heat exchange with air in the air passage;
a first door disposed in the case for opening and closing the first opening portion and a communication path that is provided within the case upstream of the second opening portions, wherein the first door is a rotary door including a rotation shaft, an outer peripheral door surface separated from a center axial line of the rotation shaft to a radial outside by a predetermined distance and two side plates connected to the rotation shaft and end portion of the outer peripheral surface in an axial direction of the rotation shaft;
a second door disposed downstream of the first door and the communication path, for opening and closing the second opening portions, the second door being operatively linked with the first door; and
an air distributing guide member provided in the second door to be moved integrally with the second door, wherein:
the rotary door is disposed to be rotatable between a first position where the first opening portion is closed by the rotary door, and a second position where the communication path is closed by the outer peripheral door surface of the rotary door;
when the rotary door is moved to a predetermined position between the first position and the second position, both of the first opening portion and the communication path are opened, and the second door opens at least one of the second opening portions; and
the air distributing guide member is positioned on the second door, opposite to the outer peripheral door surface of the rotary door, to be separated from the outer peripheral door surface by a predetermined distance to a radial outside, when the rotary door is moved to the predetermined position.

9. The air conditioner according to claim 8, wherein:
the first opening portion is a foot opening portion for blowing air toward a lower side in the passenger compartment;
the second opening portions include a defroster opening portion for blowing air toward an inner surface of a front windshield of the vehicle, and a face opening portion for blowing air toward an upper side in the passenger compartment; and
when the rotary door is moved to the predetermined position for opening the foot opening portion and opening the communication path by a predetermined opening degree, the second door closes the face opening portion and opens the defroster opening portion.

10. The air conditioner according to claim 8, wherein the air distributing guide member has a flat surface.

11. The air conditioner according to claim 8, wherein the air distributing guide member has a circular arc shape along a rotation locus of the outer peripheral door surface.

12. The air conditioner according to claim 8, wherein:
the second opening portions include a door side opening portion arranged at a side close to the rotary door, and an anti-door side opening portion arranged at a side far away from the rotary door than the door side opening portion;
when the rotary door is moved to the predetermined position, the second door closes the door side opening portion and opens the anti-door side opening portion, and the air distributing guide member is positioned opposite to the outer peripheral door surface of the rotary door to be separated from the outer peripheral door surface by the predetermined distance; and
when the second door is moved to a position where the door side opening portion is opened and the anti-door side opening portion is closed, the air distributing guide member is moved at a position offset from an air flow toward the door side opening portion.

13. The air conditioner according to claim 8, wherein
the second door is a rotary door including a rotation shaft, an outer peripheral door surface separated from a center axial line of the rotation shaft to a radial outside by a predetermined distance and two side plates connected to the rotation shaft and end portions of the outer peripheral surface in an axial direction of the rotation shaft.

14. The air conditioner according to claim 13, wherein the air distributing guide member is a beam member that extends in the axial direction to be connected to the two side plates.

15. The air conditioner according to claim 8, wherein the second door is a plate door having a rotation shaft and a plate member rotatable around the rotation shaft.

* * * * *